Figure 21:
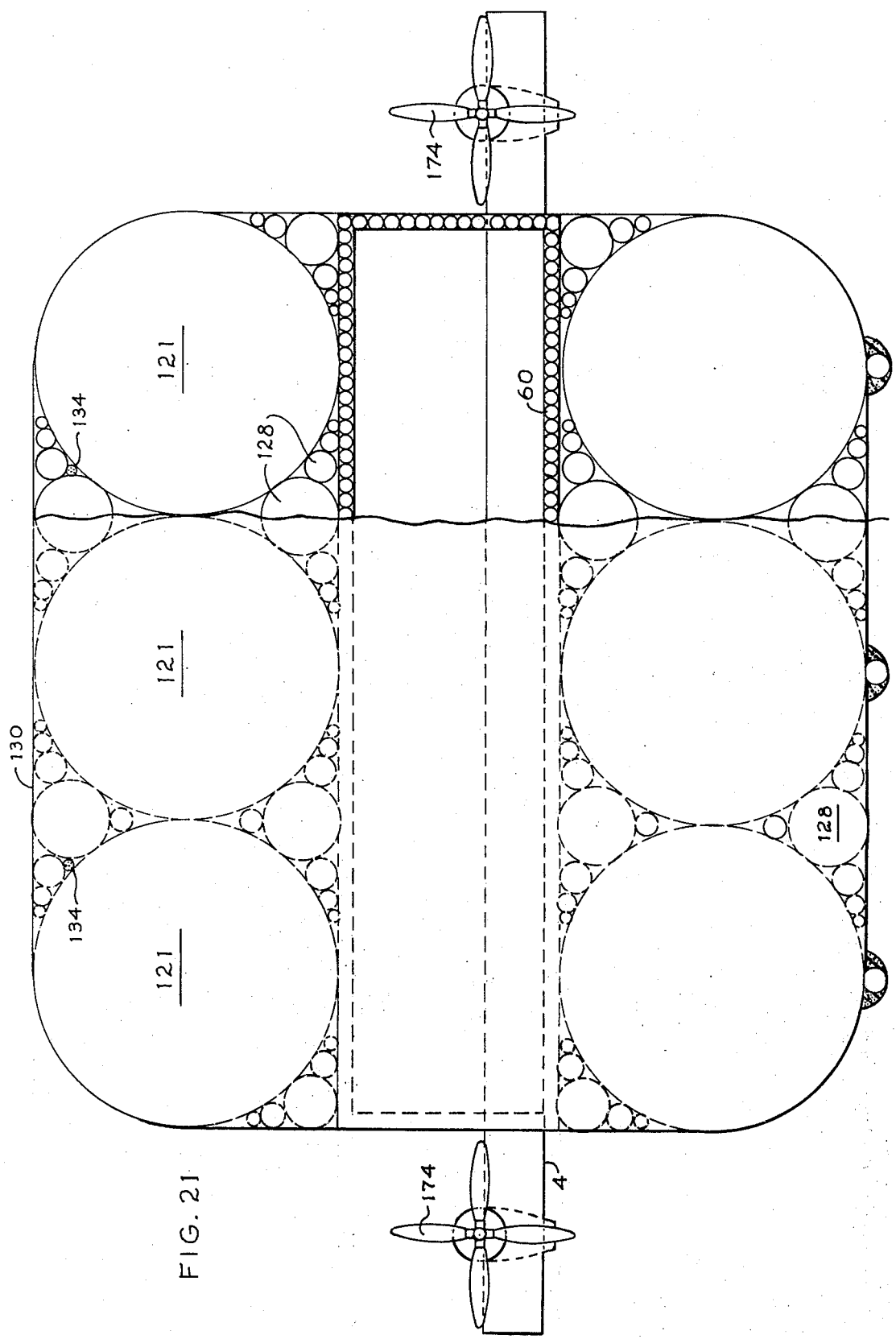

United States Patent [19]
Moore

[11] 3,801,044
[45] Apr. 2, 1974

[54] BALLOONED, STOL AIRCRAFT

[76] Inventor: Alvin Edward Moore, 916 Beach Blvd., Waveland, Miss. 39576

[22] Filed: Jan. 13, 1972

[21] Appl. No.: 217,450

[52] U.S. Cl............... 244/5, 244/17.19, 244/30, 244/125
[51] Int. Cl............................................. B64b 1/20
[58] Field of Search.......... 244/5, 4, 25, 26, 29, 30, 244/96, 119, 125, 126, 127, 128, 17-21, 48, 42 D, 103 R; 156/218, 245; 138/118; 264/96, 94; 52/2

[56] References Cited
UNITED STATES PATENTS

| | | | |
|---|---|---|---|
| 1,705,346 | 3/1929 | Traver | 244/125 |
| 1,726,062 | 8/1929 | Gilman | 244/25 |
| 1,778,273 | 10/1930 | Park et al. | 244/29 |
| 1,937,212 | 11/1933 | Waap | 244/30 |
| 2,369,652 | 2/1945 | Avery | 244/17.19 |
| 2,621,001 | 12/1952 | Roman | 244/48 X |
| 3,028,123 | 4/1962 | Sorenson | 244/48 |
| 3,226,285 | 12/1965 | Iovenko | 52/2 X |
| 3,450,374 | 6/1969 | Moore | 244/5 |
| 3,503,825 | 3/1970 | Moore | 156/245 |
| 1,340,483 | 5/1920 | Guillemet | 244/103 R |
| 2,494,208 | 1/1950 | Schultz | 244/42 D X |

FOREIGN PATENTS OR APPLICATIONS

| 837,591 | 6/1960 | Great Britain | 244/5 |
|---|---|---|---|

Primary Examiner—Duane A. Reger
Assistant Examiner—Barry L. Kelmachter

[57] ABSTRACT

A winged aircraft, adapted to takeoff and land with its longitudinal axis at a steep angle of inclination to a horizontal plane, comprising: aerostatic structure having a center of lift forward of and above a plane thru the center of gravity that tends to turn the craft into the said steep angle; a controllable-thrust stern-elevating propeller in a wind channel, having a lift rearward of the center of gravity that in horizontal flight balances the torque of the aerostatic structure; landing gear near the stern and forward of its rearmost end that supports the inclined craft on its after end when on the ground (or water when floats are used); and a forward pivoted plane that provides additional lift and balances the unusually large (maximum) torque of the stern-elevating propeller in takeoff and landing. The craft is preferably very long — like the dirigibles of the 1930's in length; and the resilient, inflated tubes of its load-carrying body are preferably flat-ended, inflated with helium at high pressure, and comprise strong, flexible material that will bend without fracture in unusual, dangerous, extreme turbulence while underway.

43 Claims, 34 Drawing Figures

3,801,044

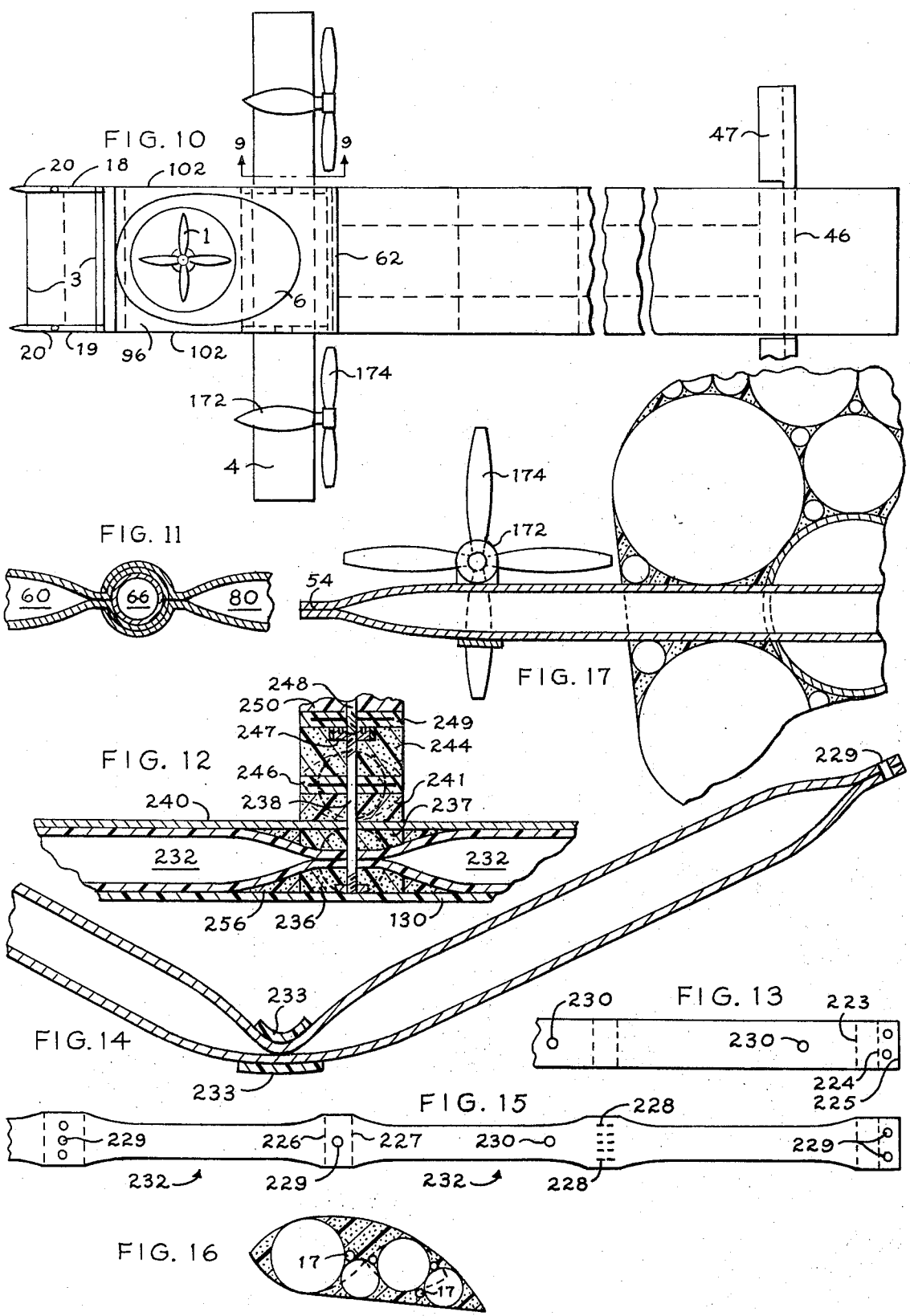

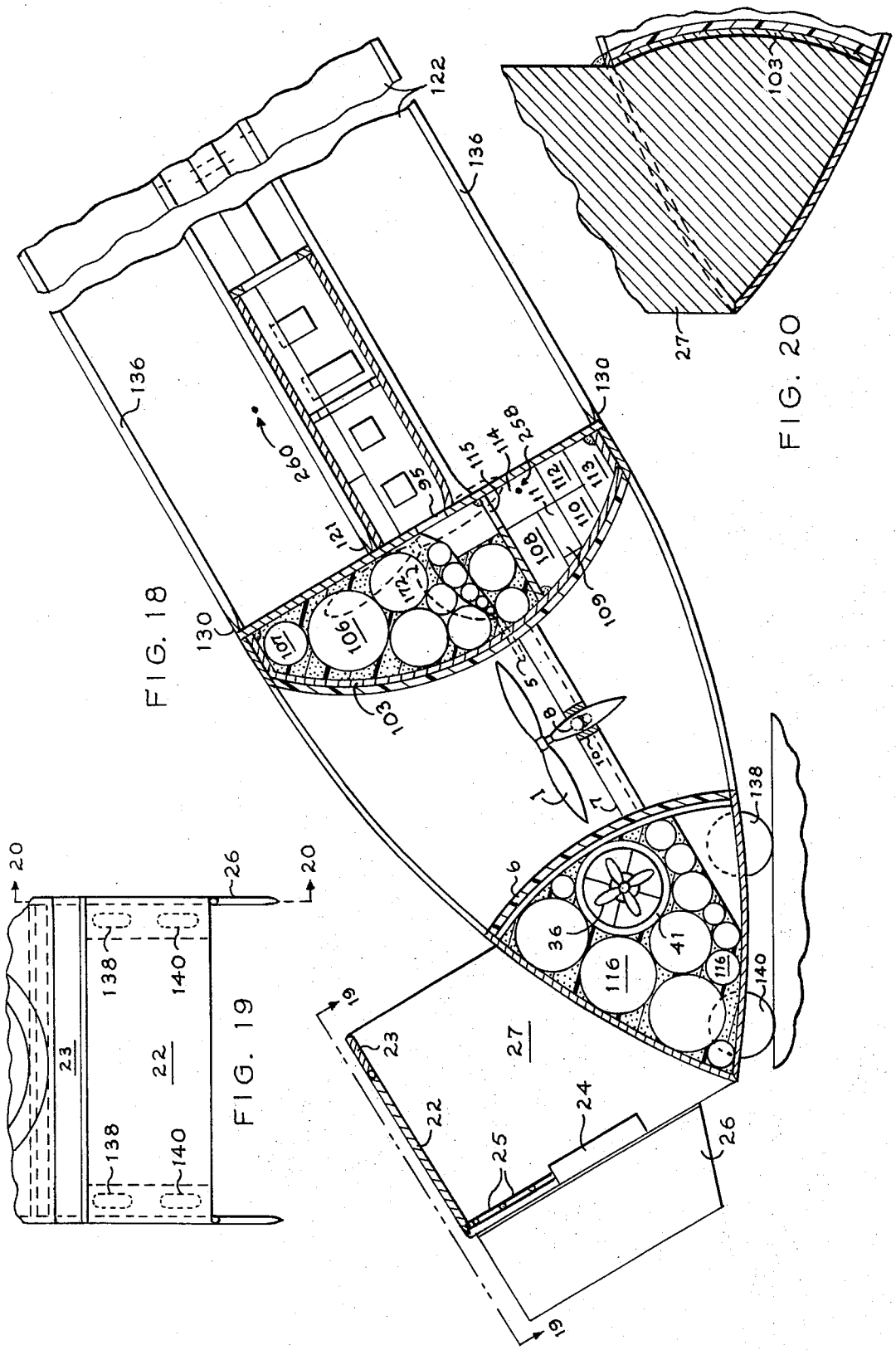

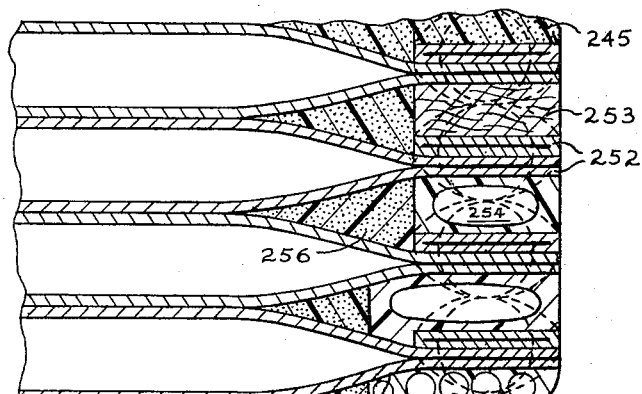
FIG. 23
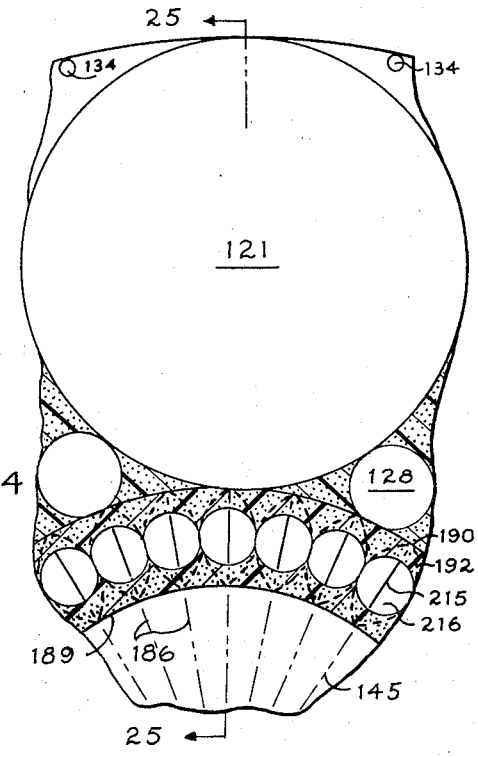
FIG. 24
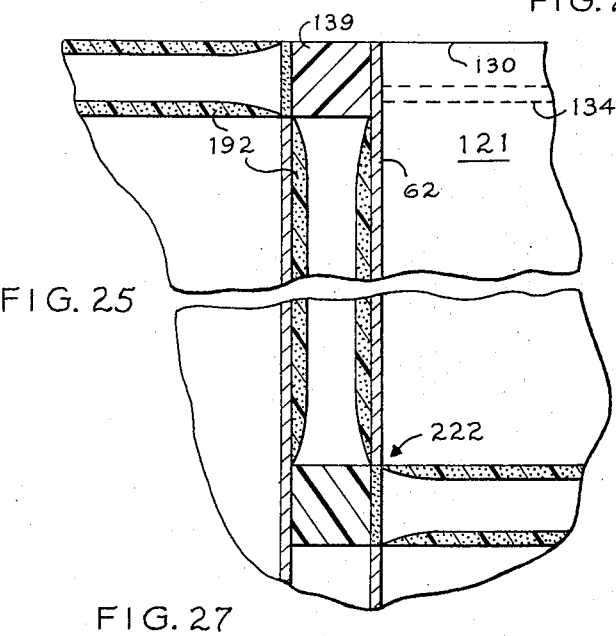
FIG. 25
FIG. 27
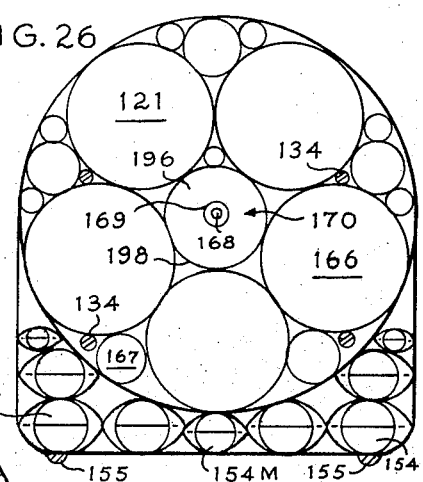
FIG. 26
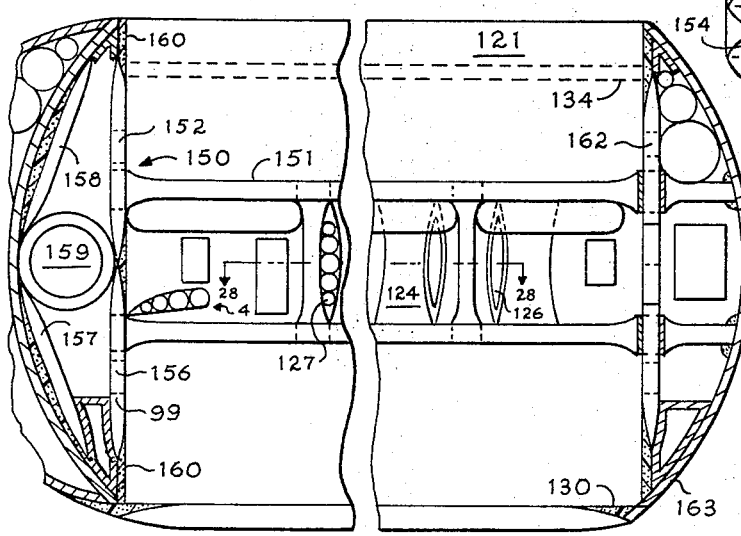
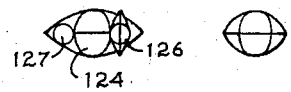
FIG. 28   FIG. 29

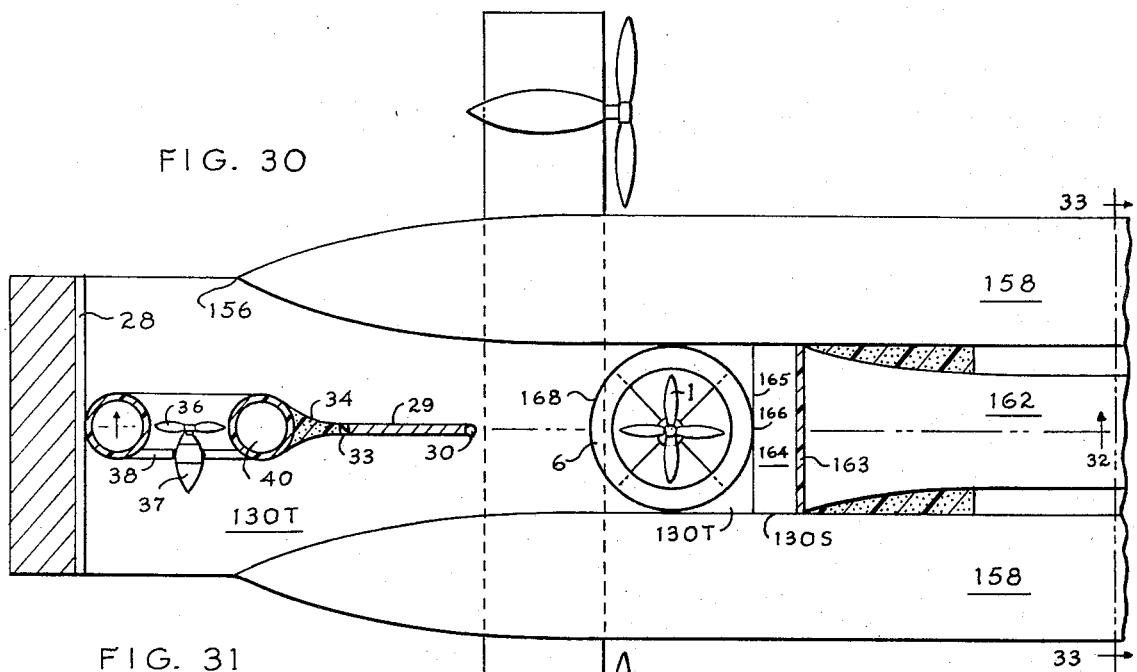
FIG. 30
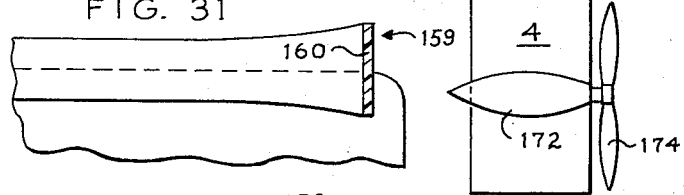
FIG. 31
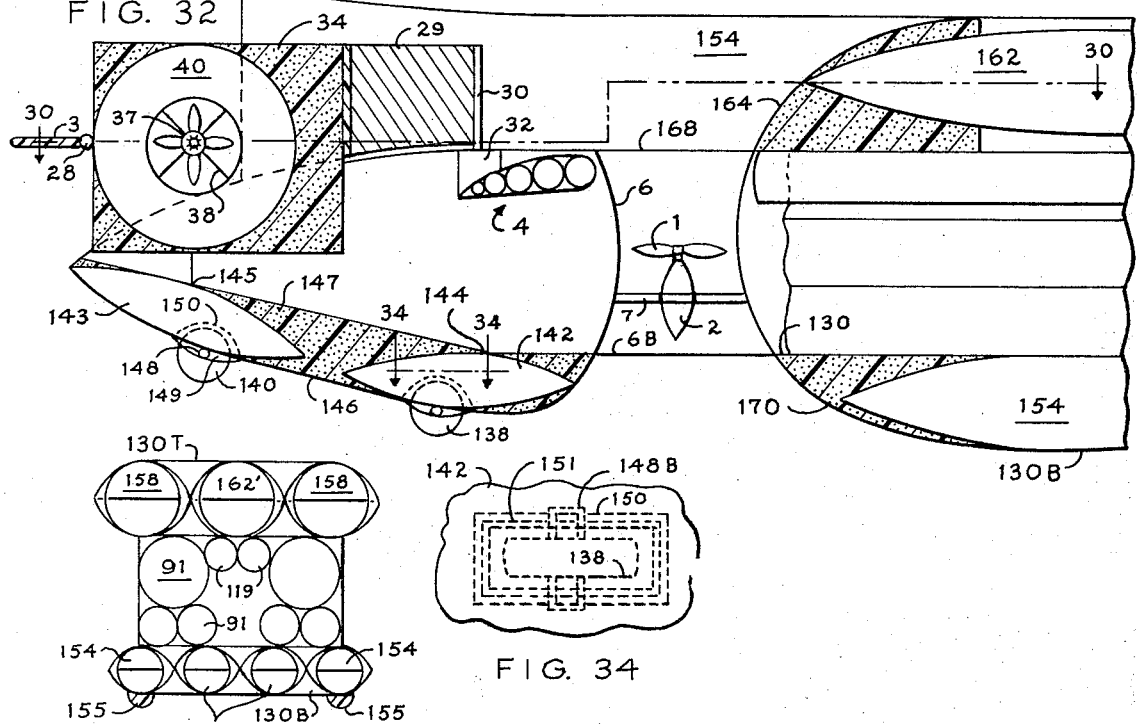
FIG. 32
FIG. 33
FIG. 34

BALLOONED, STOL AIRCRAFT

In the early part of the Twentieth Century the airship, or dirigible balloon, was a highly successful type of aircraft. In Germany, although lifted by explosive hydrogen and powered by relatively heavy engines, great ships of the air — *Hansa, Viktoria-Louise, Sachsen* — remarkably stable and airworthy, were flown for five years. They carried 37,000 passengers, without a fatality or injury. World War I interrupted their development; but after the war the *Graf Zeppelin* and the British airship R-34 were safely flown over long distances. The *Graf Zeppelin* flew over a million miles, with 144 ocean crossings, and then was retired, undamaged, in 1937. But the crashes of the U.S. Navy's *Shenandoah and Akron and the 1937 explosion and burning of Germany's* hydrogen-lifted *Hindenburg* brought the development of the rigid airship to a long pause.

The rigid dirigible as then known thus failed apparently for four reasons: (1) the hydrogen used in Germany's airships was explosive (a drawback eliminated in America by helium); (2) the necessarily along craft had elongated frame members of aluminum alloy, which tended to break up in storms; (3) grounding and anchoring the large lighter-than-air craft were problems; and (4) control of the great craft by the vaned elevators and rudders that were utilized was difficult.

In view of these facts, some of the objects of this invention are to provide: (1) a ballooned, winged, short-takeoff-and-landing (STOL), slightly heavier-than-air craft (or alternatively but not preferably, a lighter-than-air ship), comprising balloons having a center of aerostatic lift forward of the craft's center of gravity; elongated, stiffly resilient, light-weight and strong frame members of the cabin and wings comprising resilient inflated tubes of thin, ductile, strong material (for example, aluminum or relatively soft aluminum alloy) or strong plastic, capable of resisting bending under minor stresses normally encountered during flight, and when under major stress (for example in a storm) of bending from and later returning to its original shape, without fracture; (2) such a ballooned craft in which the tubular members are flat-ended and inflated with helium; (3) a craft as in objective (1) or (2) that comprises: landing gear (wheels or skids, or floats in marine use) that is rearward of the craft's center of gravity and forward of its rearmost point; forward-propelling propulsion means; and means for changing the line of propulsive thrust for aid in short takeoff and landing; (4) a ballooned winged craft comprising means for providing a center of aerostatic lift forward of the center of gravity, means for exerting aerodynamic lift having a center of aerodynamic lift that is rearward of the center of gravity, means for controlling the aerodynamic lift for providing an angle of attack of the wings that is below their stalling angle but sufficient for takeoff and landing in the desired range of short distances, and for providing a much smaller angle of wing attack in horizontal flight; (5) a craft as in objective (3) or (4) above, comprising a controllable-thrust, stern-elevating propeler on an upright axis that is rearward of the center of gravity; a craft as in (3), (4) or (5) above in which the center of aerodynamic lift of the wing means is slightly and sufficiently rearward of the craft's center of gravity to provide in cruising flight an aerodynamic torque about the gravity center that is a little less than the torque about this center of the aerostatic lift; (6) a ship as in (5) above, comprising a controllable bow-elevating means, located well forward of the center of gravity and at a moment-arm distance from this center that is considerably greater than the moment arm between the sternward center of aerodynamic lift and the center of gravity; and (7) a ship as in (6) above, in which the forward elevating means is a plane of variable lift, pivoted with respect to the cabin. Other objects will be apparent in the following specification and accompanying drawings.

Figure 22:
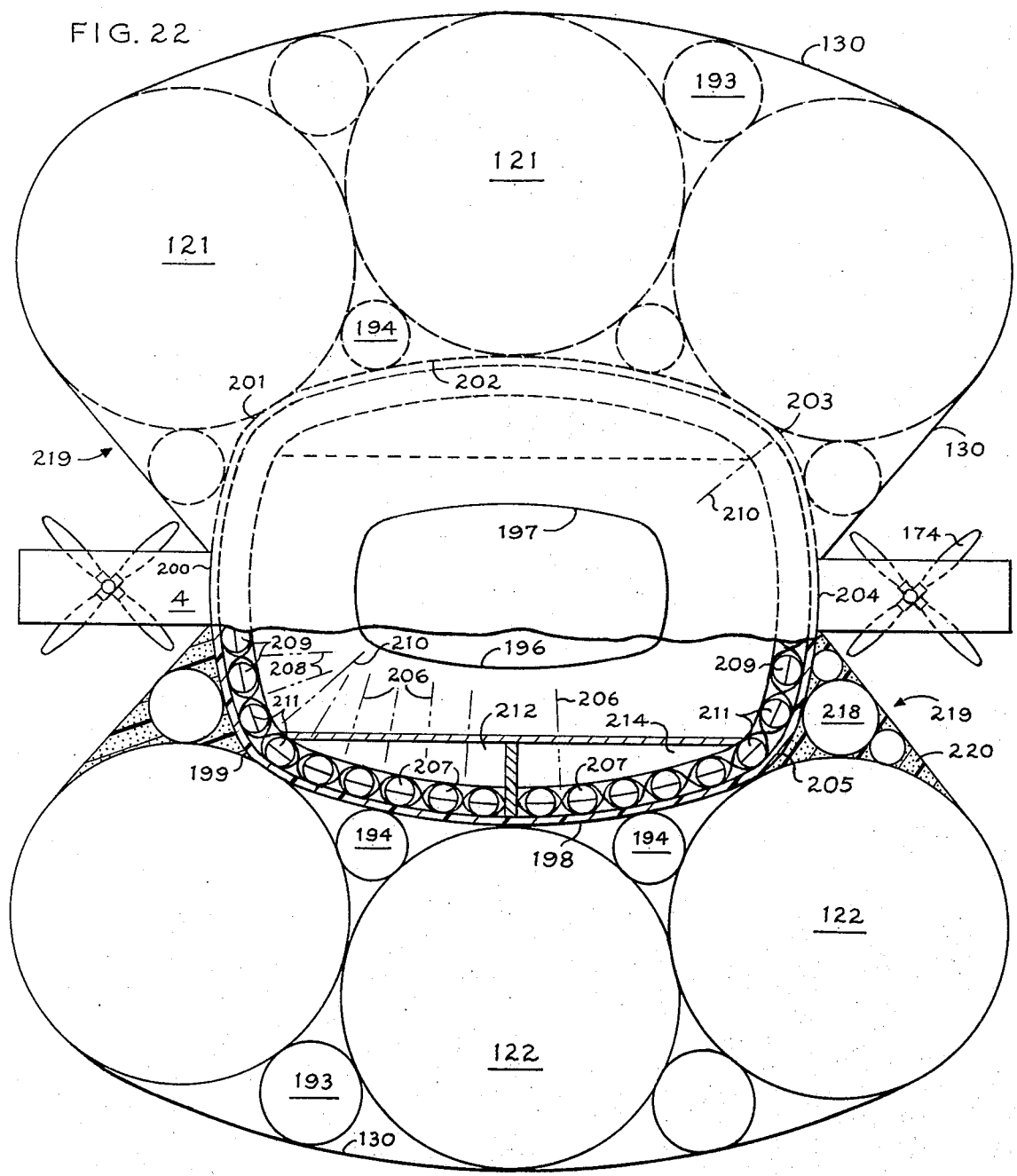

In these drawings: FIG. 1 is a side view, partly broken away and in section from a vertical plane that contains the fore-and-aft axis of the cabin, showing one form of the invented craft, having tiltable wings and propellers; FIG. 2 is a plan view, partly broken away, of the preferred type of tubular frame member, showing its tube in flat, rectangular, uninflated condition; FIG. 3 is a plan view, partly broken away, showing the flat-ended tube as inflated, preferably with helium; FIG. 4 is a view in section from the plane 4—4 of FIG. 3; FIG. 5 is a detail, sectional view, illustrating one method of attachment of a flat end of a frame tubular member to another orthogonally arranged tube; FIG. 6 is a detail, mostly plan view, in section from a horizontal plane above one of the flat-ended tubular members, showing a second, optional type of joint between a flat end and a connected tube; FIG. 7 is a detail view, similar to FIG. 6, illustrating a joint between a round middle portion of a tubular frame member and flat ends of two other inflated tubular members whose axes are normal to the axis of the round middle portion; FIG. 8 is a plan view of a flat end portion of one of the tubes in the type of joint shown in either FIG. 6 or FIG. 7; FIG. 9 is a view in section from the plane 9—9 of FIG. 10, on a scale enlarged from that of FIG. 1 or FIG. 10; FIG. 10 is a plan view, partly broken away and on a reduced scale, of the craft of FIG. 1; FIG. 11 is a detail, sectional view, illustrating another optional type of joint between two flat-ended aligned tubes and a third tubular member whose axis is transverse to that of each of the aligned tubes; FIG. 12 is a sectional detail view thru a portion of one form of the cabin wall, indicating an optional form of attachment of a tubular partition to an exterior tubular wall; FIG. 13 is a detail plan view indicating the type of elongated flattened tubes that are inflated to form the exterior tubular members of FIGS. 12, 14 and 15; FIG. 14 is a detail, sectional view indicating the elongated cabin-wall tubular member of the optional type shown in FIG. 12; FIG. 15 is a detail plan view of the optional flat-jointed type of tubular member of FIG. 14; FIG. 16 is a detail view in cross section of an optional form of the wing, preferably utilizing flat-ended inflated tubes; FIG. 17 is an elevational view, partly broken away and in section from a vertical plane thru the forward one of the inflated wing tubes, this view being transverse to the longitudinal axis of an optional form of the craft, comprising fixed wings; FIG. 18 is a side view, partly broken away and in section from a vertical plane containing the longitudinal axis, illustrating a rearward portion of a second, optional fixed-wing form of the invented aircraft, in position for takeoff, having balloon bags within an enveloping frame of flat-ended inflated tubes; FIG. 19 is a detail plan view, from the plane 19—19 of FIG. 18, of part of the heavier after portion of the craft of FIG. 18; FIG. 20 is a detail, sectional view from the plane 20—20 of FIG. 19, indicating the strong joint between the rear body frame and the combined fin and wheel-supporting plate; FIG. 21 is an enlarged, front elevational view of the vehicle of FIG. 18, partly broken away to illustrate in vertical section the frame tubular members and aerostatic means of a portion of the craft forward of the propellers, with skid-like forward landing means that comprise inflated tubes imbedded in strong foam plastic in tough-material skins; FIG. 22 is a rear elevational view, partly in cross section from a plane rearward of the wings and propulsive units, illustrating an arcuate-walled, optionally barrel-curved form of the load-carrying body; FIG. 23 is a detail, cross-sectional view, showing an optional junction between orthogonal exterior walls of the load-carrying body; FIG. 24 is a detail view, partly broken away, in cross section thru the invented vehicle, showing an arcuate-walled cabin that comprises flat-ended tubular members; FIG. 25 is a sectional detail view from the plane 25—25 of FIG. 24; FIG. 26 is a midship, cross-sectional, sternward view of the balloon-encircled-cabin form of the invented craft, adapted for rocket-powered or turbojet-powered air or space travel, in which the balloons are shaped to provide aerodynamic lift during takeoff and landing; FIG. 27 is a view, partly broken away, in longitudinal section from a plane containing the fore-and aft axis, showing another optional, winged form of the vehicle, comprising flat-ended, tubular members; FIG. 28 is a sectional detail view from the plane 28—28 of FIG. 27, illustrating three of the interior balloons; FIG. 29 is a sectional detail view from a plane comparable to that indicated at 28—28 of FIG. 27, showing one of the main sidewall, flat-ended balloons in cross section; FIG. 30 is a plan view, partly broken away and in section from the planes 30—30 of FIG. 32, of another form of the invented craft; FIG. 31 is a detail top-plan view of a forward corner of the craft of FIG. 30, on a scale reduced from that of FIG. 30 illustrating in horizontal section a forward flat end of a side balloon of FIG. 30; FIG. 32 is a vertical sectional view from the plane 32—32 of FIG. 30; FIG. 33 is an elevational view in section and on a reduced scale from the plane 33—33 of FIG. 30; and FIG. 34 is a detail plan view on an enlarged scale from the plane indicated at 34—34 of FIG. 32.

Each of the disclosed forms of the invention comprises the following main features: an elongated cabin having a strong light-weight frame of inflated, stiffly resilient tubular members; balloons above and below the cabin having a center of aerostatic lift that optionally and preferably is forward of the vehicle's center of gravity; stern-elevating, composite attitude-controlling means having a resultant center of lift that is rearward of the center of gravity, and having a lifting force of controllable value that at its maximum exerts a torque on its moment arm about the center of gravity that is greater than the torque of the aerostatic force about this center; and other, controllable lifting means forward of the center of gravity, capable of exerting a torque on its relatively long moment arm about the center of gravity that, with the aerostatic torque, exceeds the maximum torque of the stern-elevating means, and thus at the will of the pilot raises or holds the craft and its wing means in a positive angle of attack, for short takeoff and landing or maneuvering in the air.

STERN-ELEVATING MEANS AND CONTROLS

In each of the inventive forms the rearward elevating means comprises an elevating, attitude-controlling propeller, 1, driven by the motor 2, capable of lifting a substantial portion of the vehicle's weight, in normal horizontal flight driven at moderate, less-than-maximum speed and used to balance a substantial portion of the counteracting torque of the aerostatic means, with the remainder of the rearward balancing of the aerostatic torque being provided by the wings which preferably are a little rearward of the center of gravity. This elevating propeller 1 has an upright-axis line of lift that is rearward of the craft's center of gravity, and provides a torque about this center that is controllable by the pilot and at or near its maximum is greater than the torque of the aerostatic means, thus (in maneuvering) changing the pitch angle of the vehicle into a negative angle of attack. Optionally, this propeller 1 may have a fixed pitch angle, or be of controllable pitch or controllable and reversible in pitch. The motor 2 may be of any known type of engine or electric or fluid motor; but for insuring its long-continued operation in the air it is preferably an hydraulic or air motor, or else an electric motor. Optionally in each of the forms a controllable rocket motor of known type may be substituted for the motor 2 and propeller 1.

Optionally, the composite rearward elevating means also comprises two other features: an elevating plane 3 of known type, pivoted, controllable by the pilot by known mechanism; and the wing means 4, with a center of aerodynamic lift that is preferably slightly rearward of the center of gravity. These additional rearward elevators are preferably, for in the rare event of failure of the elevating means 1-2 the pilot may control the craft's pitch angle by means of the elevator 3 and the wing lift, which preferably comprises lifting force on wing flaps 5 (FIG. 18) and exerts a counterclockwise torque on the short moment arm between its center of lift and the vehicle's center of gravity.

The propeller 1 is preferably located in and supported by a wind-channel 6. This wind-channel, venturi-shaped in sectional planes containing its axis, may be formed of molded plastic (reinforced with fibers or fabric) or of thin metal. Or optionally it may be formed of: stacked, closely juxtaposed, inflated, doughnut-shaped plastic or thin-metal tubes or inflated, plastic or metallic, uprightly arranged, juxtaposed, curved-axis tubes each of which extends from the upper, wind-entrance opening to the bottom, wind-exit opening, these upright tubes being sheathed in plastic skins. Four orthogonally arranged elevating-propeller supports 7, fixed within the channel 6, may be metal bars, but as shown each comprises strongly inflated plastic or metallic tubes 8 and 9, of different diameters, preferably in a streamlined skin. These tubes, inflated with air or helium, support a metallic ring or band 10; and within this band the motor 2 is fixed.

The wing means may be: fixed to the cabin structure as indicated in FIGS. 18, 21, 27, 30 and 32; or pivoted in or on the cabin as shown in FIGS. 1 and 10; or comprise a somewhat flat bottom of the long fuselage (exampled in FIGS. 1, 18, 21, 22, 26, 27 and 33) which, when it is underway, has an angle of attack due to the controlled balance of the torques from the rearward elevating means, and from the aerostatic means, thus providing aerodynamic lift. In all the basic craft forms except that of FIG. 26 the wing means comprises a propeller-supporting wing jutting from each side of the fuselage and having strongly inflated frame or spar tubes of different diameters. These tubular spars optionally may have rounded-disk ends, and contain air; but preferably, and as indicated in FIG. 17, they contain helium and have flattened and sealed ends. They are housed in a tightly enveloping wing skin and preferably, as shown in FIG. 9, are imbedded in foam plastic 12 that preferably is stiffly resilient. The tubes (14, 15, 16, etc.) are constructed and arranged, in diameters and spacing, to provide contact between inflated-tube lines and the streamlined, flexible wing skin that does not interfere with smooth aerodynamic flow over the skin. Optional arrangements of the wing-spar tubes are illustrated in FIGS. 9 and 16. In FIG. 16, small-diameter bracing tubes of strong plastic or metal or bamboo are shown at 17; when of plastic or metal these are preferably flat-ended and inflated with helium. For wing strength of either arrangement these tubular members preferably extend thru the cabin; but as shown in FIG. 1, some of them may be interrupted with disk-ends glued to parts of a wing-rotating motor assembly.

Optional arrangements of the rearmost vehicle-attitude controls (each being usable in any of the disclosed inventive forms) are shown in FIGS. 1 and 10, FIGS. 18 and 19, and FIGS. 30 and 32. In FIGS. 1 and 10 the elevator 3 is hinged to the bases of the two upright stabilizing fins 18 and 19, and twin rudders 20 are hinged to after edges of the fins. In FIGS. 18 and 19 the elevator 22 is hinged to the rear edge of the stabilizer 23 and controlled by the pilot via the hydraulic motor 24 and pivoted linkage 25; and the rudders 26 are hinged to rear edges of the pair of fins 27. In FIGS. 30 and 32: the elevator 3 is hinged at 28 to the rearmost part of a steering-propeller support; the streamlined casing of this propeller acts as a vertical-fin-like means stabilizing against yaw; and the rudder 29 is preferably another anti-yaw stabilizing means. The rudder, which is fixed to the rudder post 30, may be rotated in steering by the hydraulic or other servo motor 32 at the will of the pilot, and has fixed to its edge a bar of foam rubber or other resilient plastic, 33. This plastic strip — similar to weather stripping — has a fore-and-aft dimension that is slightly greater than the fore-and-aft space between the rudder's rear edge and the forward edge of the foam plastic fairing 34 (which aids in streamlining the steering propeller casing), so that (as indicated in FIG. 30) when the rudder is in fore-and-aft position the airstream of the craft's travel smoothly flows around the rudder and casing. This rudder is preferably held by its motor and linkage or gearing in this fore-and-aft, anti-yaw-stabilizing position, and is used by the pilot for steering only in the unlikely event of failure of the steering propeller and motor. The steering propeller in each inventive form is normally used to steer the long and rather bulky craft.

Optionally, this steering propeller, 36, may have a fixed pitch angle, with its thrust variable by control of the speed of its hydraulic or electric motor 37, or be of controllable pitch, or controllable and reversible in pitch. In a manner similar to the elevating propeller assembly, the steering propeller is supported in the middle of its outwardly flared casing or wind-tube by bands 38, and the wind tube may be made of reinforced plastic, thin metal or of inflated tubes of the type described above in respect to the wind channel 6. As illustrated in FIGS. 30 and 32, the steering-propeller wind-tube comprises a single doughnut-shaped tube 40, of plastic and fabric, inflated with helium or air; preferably, it is streamlined by both the forward fairing 34 and also a similar rear fairing that terminates in a narrow band glued to part of the hinge 28.

As exampled in FIGS. 1 and 18 this wind-tube comprises a fabric-sheathed set of juxtaposed, coaxial, inflated, doughnut-shaped tubes 41, with sidewalls of each adjacent pair of the tubes epoxy-glued together and side walls of the outer tubes of the set glued to interior surfaces of the fin plates 18 or 27.

As shown in FIG. 1, the forward elevator optionally may be a single pivoted, streamlined element 42, extending thru the cabin and jutting outside of it on both sides, adjustable at the will of the pilot by the hydraulic or other servo motor 44. Or, as illustrated in FIG. 10, it may comprise a spar 46, pivoted in the cabin sidewalls, supporting the outside streamlined vanes 47, and rotatable by a motor like 44 and pivoted links connected to spar 46.

THE CABIN

The load carrying body, in each invention form optionally may be H-shaped in vertical longitudinal section, as illustrated in FIGS. 1, 24 and 25, 27; or it may be of the substantially streamlined or elongated shape of FIGS. 26 and 32.

In some uses of the invention this body may be made of elongated, curved-in-cross-section, molded panels of stiffly resilient plastic or thin, ductile, die-formed sheet metal, preferably having reinforcing ridges extending longitudinally or transversely of the panel's axis; these panels being somewhat similar to barrel staves, and glued or welded at their side edges into a cylindrical or barrel-shaped cabin. But preferably and as illustrated in FIGS. 1 to 8, 11 to 15, 18, 21, 22 to 25 and 27 it comprises sealed, strongly inflated, tubular members of thin plastic or metal capable of a multiplicity of bendings under major shock without fracturing. An important part of this invention is the preferred flat-ended form of the inflated frame tubes, shown in detail in FIGS. 2 to 6, used in both the stiffly resilient wings and cabin. An advantage provided by this invention that solves the long-existent problem of storm or crash-landing breakup of the frame members of elongated, dirigible-length aircraft is the fact that on major impact the stiffly resilient falt-ended tubes yield and then return to their former shape after the shock. But under the normal minor impacts of air travel the tubes are inflated under sufficient pressure to hold their shape without yielding.

As indicated in FIG. 2 the uninflated tube may be in the form of a rectangular blank, 48, or two flat, closely adjacent piles that are hermetically joined at their side and end edges, for example by welding epoxy-gluing, or molded, integral junctions. The material of this blank may be, for example, of ductile aluminum, soft aluminum alloy, soft, extraordinarily thin steel, other ductile metal, or strong plastic that preferably is impermeable or nearly impermeable to gas. If a plastic or plastic-reinforced nylon is used of the type that is permeable to helium each tube is preferably provided with a valve and repeatedly inflated from within the cabin. One good material for these tubes is polypropylene plastic which has been called the "living hinge" because it may be bent without fracture a multitude of times. Another good material, currently preferred, comprises thin, soft aluminum alloy, permanently sealed and gas-pressurized.

One method of making the blank of FIG. 2 comprises the following steps: (1) folding a rectangular sheet of the selected metal or plastic along its middle elongated line; (2) sealing a valve (or small gas-inlet tube) in one wall of the blank and sealing the adjacent sides and end edges of the folded plies with welding or epoxy cement; (3) inflating the tube with helium (or hydrogen, mixed with a small percentage of inert gas); and (4) if the material is substantially impermeable to gas, permanently sealing the valve or small gas-inlet tube. Another method of making it is like the above-described method except that steps (1) and (2) comprise superposing one rectangular piece on another separate and equal piece and then hermetically joining the four pairs of side and end edges. And a third optional method comprises the following steps (1) and (2): collapsing a thin-walled extruded tube into the rectangular form of FIG. 2, sealing the adjacent flattened end edges, and then inflating the blank with lighter-than-air gas.

Still another optional way of making the inflated flat-ended tube is to blow-mold plastic with helium in accordance with the method of the present inventor's U.S. Pat. No. 3,503,825 of Mar. 31, 1970, utilizing an elongated, flat-ended mold of the type of FIG. 1 of that patent and its retractable gas-injection tube.

FIGS. 3 and 4 show the inflated, middle-curved, flat-ended shape of the resultant tubular member. When its length is five or more times its diameter its central portion is circular in cross-section, and from this central portion it curvingly tapers to its flat ends, with pairs of outward tapers 50 on two of its sides and pairs of inward tapers 52 on its other two sides. The length of these curved tapers, from the plane 53 to the line 54 at the edge of the welding or glue of the flattened end depends on the diameter of the circle of a middle tubular cross section when and if the tube is long enough to have a circular cross section. The ratio of the taper length to the diameter is the same for all tube diameters and may be exactly determined by mathematical calculations. The length of this taper has been roughly and empirically ascertained to be over two times the potential diameter of the tubular member. The width of the major dimension of the flat band of welding or glue at 54 is approximately 1.57 times the diameter. The holes 56 are for aid in attachment of the tube to another structure by means of bolts or rivets, for example where the flat end of the tube 58 or 60 of FIG. 1 is bent and bolted or riveted to the cabin plate 62, the end of 58 being bent upward or downward and the end 61 of the tube 60 being laterally bent. The flat ends may be forked as illustrated in FIG. 5 by slitting the tube outside of the welding or glue 54; and the forked portions 63, preferably thickened and reinforced by glued or welded bands, may be bent around and fastened to another tube, as by epoxy glue or welding 64. Or the glued-together band of two plies of the flat-end portions may be bent entirely around a tube and glued, bolted or otherwise fastened to it.

As illustrated in FIGS. 1, 18 and 25, the cabin has an H-shape in section along a vertical plane containing its longitudinal axis, thus providing ells between which the main balloons are positioned, secured and supported. These ells comprise at one of the sets of balloon ends the plate or transverse cabin wall 62 and at the other set of balloon ends the juxtaposed, skin-sheathed, inflated tubes 66 which form a second transverse cabin wall. These balloon ends preferably are of much greater vertical extent than the distance between the upper and lower sets of the inflated tubes 58 and 60 of the elongated middle part of the cabin. But, as indicated in FIG. 10, the horizontal width of the plate 62 (and of the opposite set of tubes 66) is the same as that of this elongated part.

The forward cabin part 68 comprises: a central compartment, in which the pilot and others may sit (the pilot can see forward, upward and downward from the craft thru the plexiglass windows 70, and to each side and partially rearward thru the elongated, side windows 71 (one on each side of the compartment), and preferably can see to the area abaft the stern by use of a periscope extending thru one of the side windows); a lower compartment 72 in which baggage and other things may be stored; a bottom compartment 74 that contains one of three transversely aligned fuel (or water) tanks 75 (of which only one is shown in FIG. 1); and an upper compartment that contains balloons 76 and 77, filled with helium or other lighter-than-air gas, and optionally imbedded in foam plastic 78.

This forward part may be made entirely of sheet metal or molded plastic parts (optionally ridged), like the after part of the craft, but preferably the major portion of its framing comprises flat-ended inflated tubes (66, 80, 81, 82 and 83), of the above-described type. The element 84 (above the inner window 70) is an inflated tube that is not flat-ended; and 85 designates a sheet-metal or plastic segment of a cylinder having the front window opening, framed by the plates 86. The rearward end of the tube 81 is fastened to a tube 66 in the manner of FIG. 5, preferably with flexible reinforcing pieces of plate or sheeting, glued or welded to the forked portions. The forward end of each of the tubes 80 and 81 is epoxy-glued or welded and optionally riveted or bolted to a parallel flat end of a tube 82. The rearward flat end of the tube 80 is fastened around 66 and to a flat end of 60 in the manner shown in FIG. 11. A plurality of bracing rods 87, to which the plate 86 is fixed, have flat ends that are epoxy-glued or welded and/or riveted to the forward flat ends of the tubes 80. Each of the tubes 83 is fastened at its forward flat end to the tube 84 as indicated in FIG. 6. This flat end is shaped as in FIG. 8, with forks 88 that are placed around 84; an then clevis-shaped pieces of sheet on plate (89) are placed above and below 88 and glued or welded and riveted or bolted to 88. The rearward flat end of 83 also has band-reinforced forks 88; and as illustrated in FIG. 7 these go around the tube 66 and are fastened to similar forks of a flat end of the tube 58.

The middle cabin part 90 provides the main payload-containing space, in which passengers and/or freight may be located, and also has an elongated portion housing the balloon bags 91 on each side of a narrow walkway. These bags are large enough in cross-sectional area to provide only a narrow walking space between them. The relatively large volume of these balloon bags and the main upper and lower balloons 121 and 122 provide the principal aerostatic lift for the vehicle. Because of drag the width and depth of the craft are limited; but in the engineering design the length of the top and bottom balloons and of this balloon-and-corridor space in the middle section 90 may be increased, for desired extra load, with minimum increase in drag. Optionally, the middle-section tubes 58 and 60 and the similar, vertically stacked sidewall tubes may be lined by thin aluminum or plastic sheeting, 92. As exampled, this lining is restricted to two of the passenger-carrying compartments, having windows 93, a door 94 to the outside, and a door 95 to the rear cabin part. Windowed elements (doors and windows) are provided in each of the inventive forms of the vehicle.

The rear cabin section is illustrated as being mostly made of sheeting (of aluminum alloy, other metal or reinforced plastic, preferably ridged); but optionally and preferably, as exampled in FIGS. 23 to 25, its framing mostly comprises inflated flat-ended tubes. As exampled in FIGS. 1 and 10, this after part comprises a streamlined metal or reinforced-plastic shell 96, bonded by welding or epoxy and/or bolted to the plate 62. This shell and the horizontal partitions 97 and 98 help support the above-described wings and stern elevators and controls. The composite shell 96, apertured at 99 and 100 to conform to the openings of the upright-axis wind channel, thus providing free passage of the wind stream from the top to the bottom of the craft, comprises: metallic, plastic or tubular, skin-sheathed side walls 102 of the after end of the cabin, fixed by epoxy, welding, bolted tabs, or the like to side edges of 62, 97 and 98; upper and lower walls (indicated by the numerals 96 and 96′ in FIG. 1); an arcuate-in-cross-section cabin wall 103 (a forwardly flanged segment of a cylinder), fixed by bonding material (welding or epoxy) and bolts or rivets to the front of the wind channel 6; and a rearmost, arcuate-in cross-section cabin wall, 104, also a segment of a cylinder, and similarly fixed to the rear uprightly curved line of the channel 6.

In he top part of the shell 96 balloons 106 and 107, preferably imbedded in foam plastic, are located. And in the bottom part of 96 some of the heavier elements of the craft are located. These comprise: an auxiliary engine 108; a pump assembly 109, for pumping fuel and/or water in trimming the aircraft; an hydraulic-fluid accumulator 110; an electric generator 111; batteries 112; a row of three fuel and/or water tanks extending transversely of the vehicle, of which only the middle one (113) is shown in FIG. 1; and a compartment 114 (with access doors 95 and 115), providing room for repair or replacement of the units 108 to 113. A balloon-and-foam-plastic unit that is rearward of the wall 104, and fixed to it by epoxy between this wall and the walls 18, and a streamlined envelope of flexible, fibrous or metallic fabric, completes the sternward streamlining of the craft. This unit, permanently joined by epoxy to the bases of the fins 18, and inclosing the steering-propeller tube, comprises preferably cylindrical but optionally flat-ended-tube balloons, within stiffly resilient foam plastic and the enveloping, streamlined skin of metallic or fibrous fabric. It may be made in a sub-assembly mold before the wall 104 is fastened to the side walls 102. Or, optionally and its foam plastic may be poured in situ around the balloons and steering-propeller unit after the wall 104 is fixed to the side plates 18 and the wind-tube 6; and after the balloons 116 are glued to the envelope 41 of the steering-propeller tubes and the waterproof flexible sheath 118 is in place, the pressure of the foaming liquids in forming the foam plastic automatically forces the sheath outward into arcuate-in-cross section, streamlined curves. (Optionally the sheath 118 may be made of two cylindrically segmental, die or mold formed plates or sheets of shape-holding metal or reinforced plastic, joined at the aftermost line of the craft's streamlining.)

THE AEROSTATIC LIFT

As exampled in FIGS. 1 and 18, the aerostatic means comprises the main balloon units 121 and 122 and the secondary balloon 76, 77, 91, 106, 107, 116, 119, 120. FIGS. 17, 22, 27 and 30 to 33 show other various arrangement of the aerostatic units, which optionally may be used in each of the inventive forms. The overhead balloons 119 and 120, lining the ceilings of the cabin's middle part, disk-ended or round-ended as shown, are preferably used in each of the inventive forms where they do not uuduly interfere with headroom for walking. FIGS. 27 and 28 illustrate an optional form of the balloons that line the side walls of the elongated, substantially unweighted central portion of the cabin, in the flat-ended, upright-axis aerostatic units 124, 126 and 127. Each of the main balloon units 121 and 122 and of the balloon filler units 128 (FIGS. 21 and 24) or 218 (FIG. 22) preferably comprises a plurality of balloon bags in fore-and-aft alignment, within the outer, preferably vehicle-strengthening skin 130.

Within this skin also, in each of the forms of the invention, ballonets 129, of known construction, are provided; these are controllably inflatable with air before takeoff to insure smooth, safe distention of the helium-containing thin-walled envelope 130 at ground-level atmospheric pressure, and deflatable at a higher altitude. In the inventive forms exampled in FIG. 18, illustrating strongly inflated, flat-ended frame tubes 136 that hold the skin 130 in streamlined condition (optionally usable in each of the invention forms), these ballonets preferably are not used.

In each form the skin 130, of plastic and fibrous fabric or flexible metallic fabric or of thin soft-aluminum or plastic sheeting, thus envelops the main balloons and the middle part of the cabin and provides for smooth flow of air over the streamlined craft. As exampled in FIG. 1, as well as FIG. 18, additional vehicle-strengthening means is preferably provided. In FIG. 1 this means comprises the curved strip 132 of tough material — for example resilient, fabric-reinforced rubber, similar to smooth outer material of a worn automobile tire casing. This wide strip strengthens the craft longitudinally, but also protects the balloon units 122 and the skin 130 when the balloon-elevated bow of the ship is pulled down by a rope and tackle or the like for loading or storing the craft. Additional longitudinal strengtheners, also usable in each of the inventive forms, are two or more taut, elongated bracing elements, 134, which extend between and from end to end of balloon units 121, 122 and 128, and are fastened to the upright bulkheads at the ends of these units. These strengtheners may be cables; but preferably they are firmly resilient, and optionally may be small, flat-ended, helium-inflated tubes, or spring rods of small-diameter resilient steel, or nylon cords impregnated with stiffly resilient plastic. The example of the strengtheners in FIG. 18 comprises top, bottom and side sets of closely adjacent flat-ended tubes, 136; so that, within the skin 130, these tubes extend all around the middle part of the aircraft.

An important feature of this invention is the fact that the balloons are preferably constructed and arranged to have a center of lift that is sufficiently forward of the center of gravity of the loaded craft that, with the rear elevator 3 down (and, in all of the inventive forms except that of FIG. 26, the optional wing flaps down) the wing means has an angle of attack during takeoff or landing that is steep but short of the stalling angle. Thus even in the unlikely event of failure of the lifting-propeller motor 2, and even when, as is optional, the wing means is so located that its normal center of aerodynamic lift is approximately in the transverse vehicle plane containing the center of gravity, the craft descends at slow speed, with non-stalling maximum-angle lift of the wing means. Thus in an unlikely emergency the craft will land safely, like a glider. When it optionally has been designed with the normal center of wing lift a little rearward of the center of gravity, in such an emergency the following rearward lifting forces have combined rearward upward torques about the center of gravity that balance the combined forward upward torque of the aerostatic lift about this center and the controllable uplift of the forward elevator 47, holding the wing means at a little less than the stalling angle: (1) the controllable lift of the rear elevator 3; (2) the controllable lift of the optional, preferably slotted wing flaps; and (3) the lift of the wings (optionally also controllable when the wing form is that of FIGS. 1 and 10, but for simplicity and economy of construction the wings are preferably fixed as in FIGS. 17, 18, 26 and 27).

When in normal flight, and the elevating propeller 2 is normally functioning, the elevator 3 and the wing flaps and the forward elevator 47 are not down, the elevating propeller 1 at its maximum thrust has torque about the center of gravity that sufficiently overbalances the opposite torque of the aerostatic means to nose the craft downward. Thus, because in takeoff or landing with a very short run maximum lift of the elevating propeller is desirable, the optional forward elevator 47 is a preferred feature of the invention.

When the normal wing lift has been designed to be approximately at the transverse plane containing the center of gravity, in short takeoff and landing: (1) the elevator 3 and the optional wing flaps are down; the elevating propeller 1 is at or near its maximum thrust; the torque of 1, tending toward yaw of the craft, is controllably balanced by the steering propeller 36 and/or the rudder 20 (or 26); and the forward plane 47 is controllably pivoted to produce a lifting torque about its long moment arm to the center of gravity. Thus the combined lifting forces are so balanced under pilot's control that the craft is held at a steep, non-stalling angle and takes off or lands with a very short run and slow forward speed, say at 20 to 30 miles per hour. In this non-stallingly steep takeoff or landing a percentage of the lift, in each of the inventive forms is due to the steep angle of attack on the bottom of the elongated hull.

LANDING GEAR

The landing device, optionally of wheels or floats, preferably comprises an element that, when the craft is at rest on the ground (or water), provides a fulcrum that is rearward of the center of gravity by a predetermined distance, calculated with respect to the normal small weight of the loaded vehicle and the predetermined torque of aerostatic lift, to permit that torque to hold the forward part of the craft off and clear of the ground (or water surface). In FIGS. 18 and 32, this fulcrum is at the rotary axis of the wheel 138, and it provides for an inclination of the loaded craft that is illustrated in FIG. 1, and a steeper inclination of the unloaded ship, for example as shown in FIG. 18. Alternatively, this fulcrum is at the center of buoyancy of the rear floats when these are used in the place of wheels, or (when the craft is amphibian) in addition to the wheels. If the fulcrum wheel 138 is moved rearward the length of the lever arm between the load at the center of gravity and the fulcrum at the rotary axis of 138 is increased, and the bow of the craft moves downward.

In FIG. 1 the wheels 138 and 140 are similar to two other wheels on the opposite side of the vehicle; and in the craft of FIG. 32, as there exampled, only one pair of the wheels is utilized, these being in alignment below the longitudinal axis of the vehicle. Optionally in FIG. 32, the middle pair of wheels may be replaced by two pairs at opposite sides of the load-carrying body. In FIG. 1, each of the wheels 138 and 140 is journaled relatively to an oleo strut, of well known type of construction, and under shock is movable upward into a wheel well, sealed except at its wheel opening, fixed to the interior of a side wall 102. Optionally, the wheels may be retractable into these wells during flight. Either of the two types of landing gear shown as in the vehicle forms of FIG. 1 and FIG. 32 optionally may be used in either of these forms.

As illustrated in FIG. 32, the wheels are mounted on the resilient, helium-inflated, flat-ended tubes 142 and 143. The material of these tubes, like that of the inflated wing tubes, is preferably somewhat stronger than the cabin-frame tubes. Some examples of this material that thus may be used are: strong, resilient plastic reinforced by fibrous or metallic fabric or fibers; very thin, resilient steel (optionally stainless steel); and soft aluminum alloy of at least two hundredths of an inch in thickness, reinforced by plates bonded to the flat ends, and when welded or epoxy-glued at a side edge, reinforcement of this side edge by a coating or ridging of epoxy putty at this edge. Each of the tubes is strongly and flexibly fastened to the bottom of the load-carrying body, for example by a hinge and epoxy or air-set rubber cement — the tube 142 at the point 144 and the tube 143 at 145. These tubular members are within a partly cylindrical skin 146 that is fixed to the vehicle's outer skin means 130 and in its front edge to the base 6B of the wind channel 6. Resilient foam plastic 147 extends between the skin 146 and the bottom cabin wall, and around most of the tubes 142 and 143. Each wheel has an axle 148 that is journaled in the bearing 148B, FIG. 34, (or, optionally, the wheel is journaled on an axle 148 that is fixed to a wheel well 149). The top 150 of this well is hermetically sealed by bonding material around the edges 151 of the wheel hole in the bottom of the tube 142 (or 143), so that the gas inside the tube cannot escape. On receiving a shock — as in landing — the wheel and its well move upward together, carrying the resilient lower part of the tube with them, against the gaseous pressure in the tube. Also the tube then rocks against the resiliency of the foam plastic 147; and optionally further shock absorbing may be obtained by an oleo strut that has one end connected to the top 150 and its other end connected to the inside wall of the tube near the point 144 (or 145).

Since the craft is illustrated in FIG. 32 as having its bow pulled down, the wheel 140 is off the ground or other takeoff and landing surface, and the wheel 138 is on this surface, as is a relatively tough forward landing structure. This structure, which is not normally in contact with the vehicle-supporting surface in takeoff or landing, but instead is inclined into the air above that surface, comprises at least one elongated, inflated flat-ended tube, 154, of one of the strong materials referred to above in connection with the tubes 142 and 143. A single tube 154M (FIGS. 26 and 33) optionally may be in front of a single pair of the tubes 142 and 143; but when the wheel-carrying tubes consist of a fore-and-aft-aligned pair at each side of the cabin a tube 154 is provided with its axis in alignment with 142 and 143 at each of these sides (FIG. 26). Each rearward end of a tube 154 is imbeded in flexible foam plastic, and is housed in a flexible skin 130B of reinforced plastic, rubber-coated fabric or aluminum alloy that is bonded to the bottom of the cabin skin 130. As exampled in FIGS. 26 and 33, the forward landing structure optionally comprises a juxtaposed plurality of the tubes 154 and 154M, of which the middle tubes 154M preferably are thin-skinned lighter-than-air units; and below each of the side tubes 154 there is an elongated, streamlined, molded tube-stiffening and wear-taking element 155 of tough, resilient plastic — for example, rubber of the type used in automobile tire treads. The flat front end of each of the tubes 154 is oriented like the flat ends illustrated in FIGS. 31 and 33.

FIGS. 30 and 32 illustrate a flat-ended type of the balloons which is optionally usable in each of the vehicular forms. The rearward flat end 156 of each of the balloons 158 is vertical and aids in stabilizing against yawing of the vehicle. As illustrated in FIG. 31, the forward flat end 159 of each of these balloons is substantially horizontal, aiding in streamlining, and somewhat stiffening the forward end of the balloon against the wind pressure of flight. This stiffening may be augmented by a narrow, flat band that is epoxy-glued to each side of the epoxy 160 that seals the plies of the flat end of the tube; these bands of plastic or metal, may be made of a single, integral piece of sheeting and bent to fit over each flat tube end.

The middle upper balloon 162 is illustrated in FIG. 30 as having a diameter that is a little smaller than that of the balloons 158, but preferably and as exampled in FIG. 33, the balloon tubes 158 and 162' are of the same diameter. Both the forward and the rearward flattened ends of the balloon 162 (or 162') are flat in a horizontal plane. The after end is epoxy-glued at 163 to a middle horizontal line of the arcuate fairing cover sheet or plate 164 that is in the form of a segment of a cylinder. This fairing cover, of reinforced plastic or aluminum alloy, is epoxy-glued at its horizontal edge 165 to a rear part of the top skin 130T (which in this area is glued to the cabin top), and is thus glued at the point 166 to the top horizontal edge 168 of the wind channel 6, and thus glued at its side edges to lateral portions 130S of the skin means 130. As exampled in FIGS. 32 and 33, the forward part of the top skin portion 130T of the skin means 130 is substantially planar; but optionally, when 162 is of smaller diameter than 158 the middle part of the forward portion of 130T (over the balloon 162) may be lower than the top of 158, thus forming a forward channel that conducts air to the streamlined element 164. And optionally, when the lower landing-structure tubes 154M are of smaller diameter than the side tubes 154 the middle part of the forward skin portion 130B may be higher than the bottoms of 154, thus forming a forward channel leading upward to the flexible arcuate skin 170, which (like 164) is a segment of a cylinder.

PROPELLING MEANS

The propulsion means of the forms of FIGS. 1 and 10, 17, 18, 22 and 30 comprise power units (optionally of the turbojet or jet or internal-combustion-engine type) that are supported by the wings 4. Each of these units is exampled as comprising a motor (172) and a propeller 174 (of fixed or variable pitch).

Because the aerostatic and controllable aerodynamic torques may be calculated to provide any desired non-stalling angle of fixed-wing attack in takeoff and landing (this angle being increasable without stalling by slotted wing flaps of known type), the propelling units in each of the inventive forms preferably (and as illustrated in FIGS. 17, 18 and 30) have lines of thrust that are fixed with respect to the vehicle's axes. But optionally and for greater rapidity of maneuvering the motors 172 of each of the forms may be controllably pivoted on fixed wings; and optionally in each of the forms the spar tubes of the wings 4, fixedly supporting the motors, may be pivoted, as indicated in FIGS. 1 and 10, inside or on the cabin, thus increasing the maximum lift of the wings and the propeller thrusts. As shown in these figures, the wing-pivoting assembly comprises: an element that is fixed to and pivotal with the inflated wing-spar tubes (which are epoxy-bonded together), consisting of: a plate of metal or reinforced plastic 175 that is bonded to these tubes; a bar 176; flanges or pieces of plate, 177, that are welded or epoxy-bonded to the sheet 175, and to portions of the wing-spar tubes; and a bearing comprising a bearing pipe B, having bearing-surface material on it; an arcuate fluid-motor piston rod 178 that is welded or epoxy-bonded to the bar 176; a double-acting piston 180, rectangular in a longitudinal section that is transverse to the cabin, welded or epoxy-bonded to the piston rod; and arcuate fluid-motor cylinder 181 (a segment of a cylinder) fixed to wall elements 103, 97 and 62 by bonding and flanges and/or brackets 182; an inner bearing ring R at each side wall of the cabin, having a diameter approximately equal to the wing-chord distance across the bottom of the wing-spar tubes, fixed to and rotatable with these tubes and the sheet 175; and an outer bearing ring and seal 184, fixed by bonding material and/or tabs within a hole in the side wall at each side of the cabin. Within the bearing rings 184 the two bearing rings R pivot (because the upper part of this ring 184 is coaxial with the arcuate fluid-motor cylinder 181, this part is not shown in FIG. 1). For clarity of illustration, the pieces of plate 177 (optionally two vertical walls of a closed box) are shown as intersecting only part of the wing-spar tubes 15 and 16 (FIGS. 1 and 9), but in practice these flanges (or box ends) preferably are between and securely bonded to sealing disks at adjacent ends of two coaxial tubes 15 and two tubes 16. A support S optionally may be fixed to and between the stationary bearing ring 184 and the partition 98.

SOME OPTIONAL DETAILS OF THE STRUCTURE

FIGS. 22 and 24 illustrate two arcuate-in-cross section cabin forms that utilize the flat-ended, strongly inflated, helium-filled tubes in the walls. In FIGS. 24 and 25 the two flattened plies of of each of the tube ends have a middle, planar junction that lies in a plane 186 that is a radial plane of optionally either a cylinder or a segmentally arcuate section of the cabin wall of the type of the four arcuate wall sections of FIG. 22). These planes converge at a center line of curvature of the inner and outer skins 189 and 190 of the cabin wall. This arrangement enables the inflated, round tubular elements between the flattened portions to abut firmly and strengtheningly against each other, and yet there is space between the curvingly tapered tube-end portions for the liquids of the optionally used foam plastic 192 to flow around all of these tubes. In FIG. 25 the perpendicular arrangement of the flat, bonded-together tube ends is shown at two cabin corners that provide for glued attachment of one end of the balloon 121.

FIG. 22 illustrates a barrel-curved cabin, with balloons (or longitudinally arranged sets of balloon bags), 121, 122 and 193, that extend from a plane at or near the extreme forward end of the cabin to a plane that is forward of the attitude-controlling rear end of the cabin. Thus the aerostatic center lift is forward of the center of gravity. EAch of these balloon units 121, 122, 193 and 218 is sausage-shaped, having an axis that is arcuate from end to end, and is positioned to slopingly engage the exterior barrel-curved surface of the cabin. With the aid of the sausage-shaped ballonets 194 while at lower altitude, these balloon units maintain shape-preserving internal pressure on the substantially streamlined envelope 130.

The barrel-curved cabin tapers inward from its part of greatest bulge to its arcuate forward and rearward barrel-head-like ends; and the cabin tubes are longitudinally curved to conform with this barrel-like shape. The forward and rearward cabin ends are windowed at, respectively, 196 and 197; and at the rear end landing gear of one of the above described types is mounted. The outer lines of a cross-sectional plane thru the cabin comprise a plurality of arcs, 198, 199, 200, 201, 202, 203, 204 and 205, each of which has a center of curvature different from that of the adjacent arcs. Each of the arcs 198, 200, 202 and 204 has concentric radial planes that intersect the cabin wall at center lines between the longitudinal axes of the inflated tubes that are contiguous to the skin 130 at that arc. For example, each of the concentric radial planes 206 intersects the wall at the middle line between an adjacent pair of the tubes 207, this middle line passing thru the line of attachment of the reinforcing rectangular bands at the pair of flat ends (these bands being somewhat similar to the elements 89, but projecting laterally on each side of the weld line 54 as it is illustrated in FIG. 3, for attachment of adjacent flat ends). And each of the concentric radial planes 208 (on both sides of the cabin) thus intersects the arc 200 (or 204) and the cabin wall at the middle line between an adjacent pair of the tubes 209. And there is at least one radial plane (210) for each of the barrel-curved corner arcs 199, 201, 203 and 205, this plane passing thru the middle line between a pair of the tubes 211. The under-deck spaces 212 and 214 may be utilized in the forward and rearward, load-carrying cabin sections for storage of luggage or other freight thru trap doors, and utilized in the extra-balloon-carrying middle cabin part for housing balloon bags. For aid in trimming the craft this freight may be shifted toward the front or the rear or laterally.

Some optional variations of the structure of FIG. 22: the flat ends of the cabin-wall tubes may be and preferably are oriented like the flat ends 215 of the tubes 216 of FIG. 24; and each of the cabins of FIGS. 22 and 24 may be either barrel-curved or cylindrical. The balloons (or longitudinal rows of balloon bags) 121, 122, 193 and 218 may be disk-ended and disk-glued to cabin ells as indicated in FIG. 25, or may be flat-ended and attached to the cabin as indicated in FIGS. 30 to 33. The balloons 218 of the fairings 219 optionally and preferably are imbedded in foam plastic, 220.

FIGS. 13 to 15 illustrate a simply made, flexibly bendable type of resilient, flat-ended, helium-inflated tubular member, which is adapted for efficient use in making an angled joint in the cabin wall frame, for example as in FIG. 12, or as in FIG. 25 at 222. The elongated, rectangular blank utilized is illustrated in FIG. 13. It may be made by: flattening a metallic or plastic extrusion; by welding or epoxy-glueing the free, contiguous side edges of a bent strip of aluminum or plastic; or by welding or glueing both pairs of free, contiguous, side edges of two pieces of metallic or plastic sheeting, one of which is superposed on the other. Other steps of the fabricating method are: (1) hermetically welding or epoxy-bonding the ends of the rectangular strip, optionally in a band between lines 223 and 224 or between 223 and 225. (2) Welding or epoxy-glueing the contiguous plies at or between the lines 226 and 227 (this bonding optionally may hermetically seal across the blank between these lines, or a plurality of rows 228 of spot-bonding (or short seam welds) may be made, providing for flow of gas between the welded or glued spots (glued with the aid of apertures in one or both plies). (3) Drilling the holes 229 (for attachment of the tubular member to another structure); (4) hermetically bonding by welding or epoxy putty one or more gas inlets 230 (valves, or pieces of short tubing to be flattened and bonded for a permanent gas seal) — when the intermediate bonding is an hermetic band between 226 and 227 a gas inlet for each of the flat-ended links 232 is provided; but when the spot bonding 228 is utilized one gas inlet is sufficient for inflating all the links. (5) Inflating the completed rectangular member with helium or other lighter-than-air gas into the shape of FIG. 15. Optionally and preferably, between the above steps (3) and (4) another method step comprises reinforcing the thin tube-material by epoxy-bonding strong bars or bands 233 (of flexible metal or of textile or metallic fabric that is impregnated with flexible plastic) to the flatter, flexible, bendable tubular portions.

After this manufacture, and as indicated in FIG. 14, the tubular member may be bent at its intermediate flat-ended portions into any of various angles, and fastened to other structure at this angle by epoxy or other bonding material and/or rivets or bolts.

FIG. 12 illustrates optional construction of a partition — for example the doorway-comprising wall 234 or 235 of FIG. 1 — with use of flat-ended tubular members of the type shown in FIGS. 14 and 15. Two or more of the deck tubular members have flat intermediate portions between links 232; and above and below each of these portions chocks (or beams), 236 and 237, are epoxy-bonded to each flat part. These curvingly shaped chocks (or beams) may be of balsa wood or hollow metal, but preferably are of molded plastic (preferably firm, reinforced, foamed or other plastic), shaped to fit the tubular-member tapering curves. Each is fixed to an upright rod 238 (molded or glued in the chock if it is of plastic, otherwise glued or welded). These screwthreaded rods preferably are of the common, screwthreaded type, two to three feet long, and thus they stand higher above the deck sheeting or plate 240 than the rod exampled in FIG. 12. After the decking 240 is bonded to the deck tubes and around the rods 238 an interior-wall-bottom chock or filler piece 241, preferably of firm, molded plastic, is threaded down over the rod. This chock is short, and has a top surface that is curvingly tapered downward toward the decking — in a direction normal to the plane of the paper of FIG. 14 — to conform to the tapering curvatures of the lowest of the stacked tubular members of the partition. Its curvatures on each side of the flat band thus are similar to 242 in FIG. 23. Next, an attachment hole 229 (FIG. 15) in a flat, sealed portion between 226 and 227 of the lowest tubular member is threaded over the rod and bonded to the chock 241. And then over this another chock, 244, curved to fit between the tapering curvatures of two of the stacked tubes, similar to the chock 245 or 253 of FIG. 23, is threaded on the rod and bonded to a flat tubular-member portion 246. This chock 244 is thicker than 241; and all chocks above 244 to a level near the top of the partition are shaped like 244. As illustrated in FIG. 12, the upper end of the rod 238 lies below the top surface of one of the chocks 244 by a distance equal to approximately half the thickness of the relatively thick nut 247. This nut (preferably round in perimeter and having recesses in its top to receive a pronged wrench) is screwed tightly down on the rod and into a recess in 244. Epoxy glue is then dropped into the recess and around the nut; and into this recess a second threaded rod, 248, is tightly screwed down into the top half of the nut against the top of rod 238, and into contact with the unset epoxy. After this, other flat tubular-member portions (249) and other chocks (250) are bonded together on the rod 238 — to the top of the partition.

FIG. 23 shows an outer corner of the cabin wall — for example, like one of the cabin corners of FIG. 1 — in which orthogonally arranged flat tube ends, 252, are joined and bonded together with the use of taperingly curved chocks somewhat like those of FIG. 12. Optionally and as shown these chocks may be of balsa or other light-weight wood, as at 253, or plastic, as at 245. When they are of molded plastic they preferably contain inflated, egg-shaped, spherical or cylindrical inflated shells of plastic, thin metal or glass, as indicated at 254 and 255. These shells add light-weight strength to the chocks. In this figure no rods like 238 are shown; but, as in FIG. 12, such rods are optional. The foam plastic 256, formed by pouring *in situ* foaming-liquid plastic materials between parallel wall sheets and around parts of the tapering tube curves, is also optional in both these figures.

OPERATION

Preferably the center of gravity of the craft is in a lower, after part of the cabin, for example at 258 (FIG. 18). And when the vehicle is empty the center of aerostatic lift (260) is forward of the plane thru 258 that is normal to the vehicle's longitudinal axis and is above the fore-and-aft, horizontal plane thru 258. This center of aerostatic lift is thus in a position that on the ground will cause the aerostatic force and its lever arm to the fulcrum of the axis of the wheel 138 to produce sufficient torque to elevate the forward end of the empty craft into the inclination, for example, of FIG. 18 (with the craft's fore-and-aft axis at about thirty degrees to the horizontal).

While the vehicle is stationary on the ground or other landing surface, this inclination does not exceed the desired angle in the neighborhood of thirty degrees for the following reasons. When the unloaded craft has its forward end forcibly pulled down until its longitudinal axis is substantially horizontal, and the hold-down force is then released, the forward end rises against gravity exerted at point 258 due to the aerostatic lift at 260. This aerostatic force acts like human hands on a wheelbarrow, lifting the weight at 260 about the fulcrum at the axis of the wheel 138. The weight at 258 is a downward force that acts on a lever arm whose length is determined by the distance between 258 and the axis of 138; while the aerostatic lift is an upward force that acts on a lever arm to the fulcrum of 138 whose length is determined by the distance between 260 and the axis of 138. But when the rear wheel 140 comes downward into rest on the ground or other landing surface, and tends to become the fulcrum about which the weight at 258 might be further lifted, the lever system has changed. The force of the weight at 258 is now acting on a longer lever arm — to the fulcrum of the axis of 140. This lever arm thus has increased by more than a fourth of the previous lever-arm lentgh; whereas the lever arm between 258 and 260 has remained the same, and the proportion of increase in length of the lever arm between the aerostatic lift at 260 and the fulcrum is small. Thus more force at 260 would be required to lift the wheels 138 off the landing surface and further incline the craft toward the vertical. But the aerostatic means and the landing-gear elements 138 and 140 are so constructed, proportioned and arranged that, while the craft is stationary on a landing surface, loaded as illustrated in FIG. 1 or unloaded as illustrated in FIG. 18, the wheels or the like 138 are not lifted off the surface. Unloaded and untethered, the craft when at rest on the ground stabilizes at approximately the inclination of FIG. 18; loaded and untethered while thus on the ground, it stabilizes at an inclination similar to that of FIG. 1. Once in the air, it tends to be steeply inclined, with the center of buoyancy 260 over the center of gravity 258. The rear elevating propeller 1 (and/or the elevators and wing flaps) place the craft in the desired inclination for climbing or level attitude in cruising flight. Also when, as is optional, the wings are slightly rearward of the center of gravity they aid in securing the desired normal attitude.

In loading, the vehicle preferably is pulled down (by block and tackle or the like) until its longitudinal axis is substantially parallel to the ground (with the wheel or wheels 140 off the ground). (This step of the operation may be eliminated, with the passengers and crew entering the craft thru the door 94 from a ladder, hinged gangway, or elevated platform.)

In taking off, the following actions occur: (1) the forward end of the loaded craft is free to assume an inclination similar to that of FIG. 1; (2) the forward elevator 47 and the wing flaps are set for their maximum lift when underway; (3) the elevating propeller 1 is rotated to produce its maximum thrust, and the steering propeller 36 is operated at sufficient thrust to counteract the vehicle-yawing torque of the propeller 1; (4) the motors 172 are operated to produce a maximum thrust of the propellers 174; (5) When the fulcrum wheels 138 clear the ground the aerostatic lift tends to incline the craft into a steeper angle of attack, but the pilot may counteract this tendency by pivoting the rear elevator 3 to produce sufficient torque from it about the center of gravity to hold the vehicle at about the attitude of FIG. 1 or alternatively, in flying the optional form of the invention shown in FIGS. 1 and 10, the pilot may rotate the wings until they have a non-stalling angle of attack despite the steeply inclined attitude, and the craft has a short run at a steep angle comparable to that shown in FIG. 18 - near to but less than forty-five degrees - with both the non-stalled wings and the bottom of the vehicle providing lift at this steep angle; (6) after a short run the craft takes off and climbs at a steep angle, but one that does not involve a stalling angle of attack of the wings. When the inventive form that comprises non-rigid balloon sheathing is utilized: during this climb, air-exhaust valves, connected to the ballonets 129, automatically are opened to gradually empty the ballonets of air at higher altitudes, thus safely keeping the flexible envelope 130 distended into streamlined condition.

In leveling off at the desired altitude, and getting underway at below the cruising speed: (1) the rearward and forward elevators 3 and 47 are set to produce little drag or torques about the center of gravity; (2) the engines 172 are set for cruising speed; the thrust of the elevating propeller 1 is reduced as the wing lift increases with the forward speed, and adjusted until the craft is in level flight. Its attitude in pitch is now optionally controlled by the elevating propeller 1 and/or the rear elevator 3; and its attitude in yaw is controlled by the steering propeller 36 and/or the rudder.

In a normal landing: (1) the thrust of the propellers 174 is greatly reduced; the elevators 3 and 47 and the wing flaps are set for maximum or near-maximum lift; (3) the thrust of the elevating propeller 1 is adjusted until it holds the craft in a steep, non-stalling angle (for example, as in FIG. 1); and with maximum safe angle of attack of the wings the vehicle, having a net low weight, lands in a short run.

In emergency due to failure of one or both of the engines 172 the vehicle lands as stated above. In emergency due to failure of the elevating-propeller assembly 1-2 and/or of the steering propeller 36 the rear elevator 3 is set for its maximum lift and the forward elevator 147 is set at a negative angle of attack, producing enough nose-depressing torque about the center of gravity to hold the craft in an attitude that does not entail a stalling angle of attack of the wings; and thus the craft safely lands.

*The form of the invention shown in FIG. 26* comprises: the cabin or load-holding body 262; the balloons 121, 122, 264 and 128, encompassing the cabin; an annular skin 266, surrounding these balloons; flat-ended tubes 154 and 154M (of which at least one, 154M, is a thin-skinned, lighter-than-air unit, these tubes serving to fill out and flatten the bottom of the vehicle; and a lower skin, 267, providing an elongated, transversely extending lower surface, shaped to provide aerodynamic lift during takeoff and landing; and landing-gear elements 155 of tough rubber or other plastic. Thus in this form the winged means is the aerodynamic bottom of the craft. The pipe 268 is an air-inlet pipe leading rearward to a motor 269, which optionally is of the turbojet or rocket type. When it is a rocket motor the air conduit 268 is eliminated.

Various changes in the specific structure disclosed may be made without departing from the principles of the invention. For example, in a smaller, more easily controllable version the attitude-controlling propellers 1 and 36 may be eliminated, and the maximum lift of the elevator 3 is greatly increased.

This invented vehicle optionally may be: much heavier than air; slightly heavier than air both at takeoff and in landing; or when partially loaded with fuel at takeoff heavier than air and after consumption of a substantial amount of the fuel lighter than air. When, in the last-named option, the vehicle at the time of landing is lighter than air it is forced to dive downward by pivoting both the forward elevator 47 and the rear elevator 3 into negative angles of attack.

In the following claims, unless otherwise qualified, the term "tubular member" signifies: a single tube or can or a plurality of end-connected tubular articles, of any cross-sectional shape; "gaseous material" means: any pure gas or air or other gaseous mixture; or gas-cell-containing foam plastic or other gas-containing insulating material; "plastic:" any natural or synthetic plastic, including rubber; "bonding material:" welding, brazing, soldering or glue material, such as epoxy putty; "rounded:" arcuate in cross section (circular, oblong or the like); and "windowed elements" signifies doors or windows permitting vision thru them.

I claim:

1. A winged vehicle, adapted to move thru the atmosphere, capable of taking off and landing with a steep angle of attack of its wing means, comprising:
a load-holding body;
aerostatic means, connected to the said body, comprising skin means and lighter-than-air gas within the skin means having a center of lift that is forward of a plane that contains the center of gravity of the body and is normal to its longitudinal axis and above a plane that is parallel to said axis and contains the center of gravity, exerting a torque about the center of gravity tending to raise the forward part of the vehicle above its stern and to incline its longitudinal axis at a maximum angle that is less than sixty degrees of inclination to a horizontal plane;
winged means exerting lift on the craft when it is underway;
controllably adjustable stern-elevating means, rearward of the center of gravity, providing a controllable torque about the center of gravity in opposition to the torque of the said aerostatic means, and at its maximum capable of overbalancing the torque of the aerostatic means and lowering the bow of the craft below its stern; and
means for moving said vehicle thru the air;
the said load-holding body having walls that include resilient tubular members and gaseous material, comprising gas, in said members, each of at least some of said tubular members including a pair of spaced end parts and a plurality of end-joined inflated links between said end parts;
each of the said end parts comprising: a rounded portion; a substantially flat tubular-member end that includes two closely adjacent plies of tubular material, joined together, and having a relatively broad span in one direction and a relatively narrow span in another direction, and curved, tapering surfaces slanting inward from said rounded portion to said broad span, and curved, tapering surfaces slanting outward from said rounded portion to said narrow span;

each of the said links having: a rounded middle portion; a pair of spaced, wider, flatter and thinner link-end portions, each wider portion being joined to an adjacent link and comprising small amounts of bonding material between adjacent plies of the tubular-member material, said small amounts being spaced in a direction across the width of said wider portion to allow flow of said gas between adjacent links; curved, tapering surfaces slanting inward from said middle portion to said wider portion; and curved, tapering surfaces slanting outward from said middle portion to the thinner part of said wider portion.

2. A vehicle, adapted to move thru the atmosphere, capable of taking off and landing with its longitudinal axis at a steep angle of inclination to a horizontal plane, comprising:

a load-holding body having a top and a bottom that are imperforate from the body's forward end to the vicinity of the vehicle's center of gravity;

aerostatic means, connected to and encompassing a major portion of said body, comprising skin means and lighter-than-air gas within the skin means having a center of lift that is forward of a plane that is normal to said longitudinal axis and contains said center of gravity and is above a plane that is normal to said first-named plane and contains said center of gravity, exerting a torque on said body about the center of gravity tending to raise its forward part above its stern and, when in the air, to incline its longitudinal axis at an angle of over thirty degrees and less than ninety degrees to a horizontal plane, in which the center of aerostatic lift is substantially directly above the center of gravity;

stern-elevating, vehicle-attitude-controlling, propulsive means of controllable thrust, having an upright axis, and providing a controllable, stern-lifting torque about the center of gravity that is in opposition to the torque of the said aerostatic means;

means for forwardly moving said vehicle thru the air; and winged means on the bottom of the vehicle for aerodynamically lifting said body when the vehicle is underway, comprising tubes connected to bottom portions of said aerostatic means and gas under above-atmospheric pressure in said tubes and lower skin means sheathing at least bottom portions of said tubes; the said aerostatic means, tubes and lower skin means being constructed and arranged to provide a substantial longitudinal and transverse extent of the lower skin means which is inclined to the direction of forward motion and produces an aerodynamic lift on the vehicle during forward translation relative to the air.

3. A vehicle as set forth in claim 2, in which the said tubes have round middle portions and flat ends.

4. A vehicle, capable of traversing the air, comprising:

a load-holding body, including at least one pair of orthogonally arranged walls;

aerostatic means for exerting a lifting force on said body, having a center of lift that is forward of the center of gravity of the vehicle, tending when the vehicle is in the air, to incline its longitudinal axis in a positive angle of inclination to a horizontal plane having a maximum value of less than eighty degrees;

attitude-controlling means at a rear part of the vehicle, exerting torque on it about said center of gravity that is in opposition to the torque of said aerostatic means; and means for providing forward translation of said body;

the said body having walls that include tubular members and gaseous material, comprising gas, in said members, each of at least some of said tubular members comprising a pair of spaced end parts and a plurality of end-joined inflated links between said end parts;

each of the said end parts comprising: a rounded portion; a substantially flat tubular-member end that includes two adjacent plies of tubular material, joined together, having a relatively broad span in one direction and a relatively narrow span in another direction, and curved, tapering surfaces slanting inward from said rounded portion to said broad span, and curved, tapering surfaces slanting outward from said rounded portion to said narrow span;

each of the said links having: a rounded middle portion; a pair of spaced, wider, flatter and thinner link-end portions, each wider portion being joined to an adjacent link; curved, tapering, surfaces slanting inward from said middle portion to said wider portion; and curved, tapering surfaces slanting outward from said middle portion to the thinner part of said wider portion;

the said walls comprising space-filling chocks adjacent to at least some of said link-end portions; each of said chocks having a middle part that is thicker than each of its ends and curvingly tapered surfaces shaped to conform to portions of said tubular-member curved, tapering surfaces, filling space between adjacent tubular members and strengthening them at their junction.

5. A vehicle as set forth in claim 4, including: winged means, exerting lift on the craft when it is underway; and orthogonally arranged body walls, including at least some of said tubular members and chocks.

6. A vehicle as set forth in claim 4, in which said chocks comprise molded plastic.

7. A vehicle adapted to move thru the atmosphere, including:

a load-holding body;

aerostatic means, connected to the said body, comprising skin means covering at least the top forward portion of said body, and extending rearward to at least a plane that passes through the vicinity of the center of gravity and is normal to the vehicle's longitudinal axis, said aerostatic means including a plurality of balloon units containing lighter-than-air gas, and having a center of lift that is forward of a plane that contains the center of gravity of the body and is normal to its longitudinal axis, and above a plane that is normal to said first-named plane and contains the center of gravity, exerting a torque about the center of gravity tending to raise the forward part of the vehicle above its stern and to incline its longitudinal axis in an angle of inclination to a horizontal plane that is less than ninety degrees;

controllably adjustable stern-elevating means, rearward of the center of gravity, exerting a torque on said body in opposition to the torque of the aerostatic means; and means for moving said vehicle forward thru the air;

at least one of the said balloon units having: a rounded middle portion; substantially flat end portions, at least one of which extends substantially vertically into the air when the vehicle is in normal flight, acting as a stabilizer each of said flat end portions comprising two closely adjacent plies of tubular material joined together and having a relatively broad span in one direction and a relatively narrow span in another direction; curved, tapering surfaces at each end of the unit that slant inward from said rounded middle portion to said broad spans; and curved tapering surfaces at each end of the unit that slant outward from said rounded middle portion to said narrow spans.

8. A vehicle as set forth in claim 7, further including winged means exerting an aerodynamic lift on the craft when it is underway, in which: the said angle of inclination is less than sixty degrees; and the said stern-elevating means provides a torque that at its maximum is capable of overbalancing the torque of said aerostatic means and lowering the bow of the craft below its stern.

9. A vehicle as set forth in claim 7, in which at least one of said balloon units has: a said flat end portion adjacent the bow of the vehicle, with its said broad span of closely adjacent plies extending in a normally horizontal direction; and a said flat end portion at a rearward part of the vehicle, with its said broad span of closely adjacent plies extending in a normally vertical direction; portions, each of said end portions comprising two closely adjacent plies of tubular material joined together and having a relatively broad span in one direction and a relatively narrow span in another; curved, tapering surfaces slanting inward from said rounded middle portions to said broad spans; and curved, tapering surfaces slanting outward from said rounded middle portions to said arrow spans.

10. A dirigible-like vehicle, heavier than air, at least when loaded, adapted to move thru the atmosphere, capable of taking off and landing with its longitudinal axis at a steep angle of inclination to a horizontal plane, comprising:

a load-holding body, having a top and a bottom that are imperforate from the body's forward end to the vicinity of the vehicle's center of gravity;

aerostatic means, connected to the said body, comprising skin means and lighter-than-air gas within the skin means having a center of lift that is well forward of a plane that is normal to said longitudinal axis and contains the center of gravity of the vehicle and above a plane that is normal to said first-named plane and contains the center of gravity, exerting a torque about said center of gravity tending, when the vehicle is up in the air, to raise its stern and to incline its longitudinal axis at a steep angle of inclination of less than ninety degrees and of at least twenty-five degrees to a horizontal plane, with the center of aerostatic lift substantially vertically above said center of gravity;

stern-elevating, vehicle-attitude-controlling, propulsive means of controllable thrust, having an upright axis and providing a stern-lifting, controllable torque about the center of gravity that is in opposition to the torque of said aerostatic means; winged means, connected to said body, having a center of aerodynamic lift when the vehicle is underway that is between said stern-elevating means and said center of aerostatic lift;

means providing forward motion of the vehicle;

landing-gear means, holding said vehicle while stationary in an angle of inclination that is less than said steep angle, comprising at least one pair of fore-and-aft-spaced sternward landing-gear elements, mounted on said body at a location rearward of said center of gravity and forward of the rearmost end of the vehicle; the said landing-gear means and said aerostatic means being so constructed and arranged that, while the vehicle is at rest on a landing surface, landing-gear elements acts as a fulcrum of a lever arm between said forward one of said elements and said center of aerostatic lift and the rearward one of said pair acts as a stop, preventing said aerostatic lift from elevating the vehicle into said steep angle of inclination.

11. A vehicle as set forth in claim 10, in which: the rear-end portion of the bottom of said body rearwardly slopes upward toward the rearmost end of the body; the said landing-gear elements are fore-and-aft-arranged landing-gear means, mounted on the body at said rearward and upward sloping portion of its bottom, providing fulcrums for the counteracting leverages of said aerostatic means and the weight of the vehicle effective at said center of gravity, the rearward landing-gear means being spaced a substantial distance rearward of the forward landing-gear means and when at rest on a landing surface providing a subtantially longer lever arm and greater leverage between the fulcrum of its axis and the center of gravity than the lever arm and leverage between the axis of said forward landing-gear means and the center of gravity, resisting the tendency of the aerostatic means to lift the forward landing-gear means off the said surface.

12. A vehicle as set forth in claim 10, in which: said aerostatic means comprises upper and lower balloons; and the said body comprises windowed elements between the upper and lower balloons.

13. A vehicle as set forth in claim 10, in which: the rear-end portion of the bottom of said body rearwardly slopes upward toward the rearmost end of the body; the said landing-gear means comprises two fore-and-aft-spaced pairs of landing-gear elements, mounted on the body at said rearward and upward sloping portion of its bottom, each pair of said elements being at a substantially equal distance from said center of gravity, the said elements at their axes providing fulcrums for the counteracting leverages of the aerostatic means and of the weight of the vehicle effective at the center of gravity, the rearward pair of said elements being spaced a substantial distance from the forward pair and when at rest on a landing surface providing a substantially longer lever arm and greater leverage between the fulcrum of each of their axes and the center of gravity than the lever arm and leverage between each of the axes of said forward pair of elements and the center of gravity.

14. A vehicle as set forth in claim 12, in which: the said landing-gear elements are wheels; the said body comprises as part of its rear-end portion two pairs of upright, wheel-supporting plates, one pair of these plates being at one side of the vehicle and the other pair of said plates being at the other side of the vehicle; and one fore-and-aft-aligned pair of the said wheels are mounted between each pair of said plates.

15. A vehicle as set forth in claim 14, further comprising: two upright, vehicle-stabilizing fins, extending above the upper outlines of said body, the said fins being joined at their bases to upper portions of two of said plates; a horizontal-type stabilizer bridging over the space between said fins, having end edges that are joined to upper edges of the fins; and a pair of rudders hinged to rear-edge portions of two of said plates.

16. A ballooned, winged vehicle, adapted to move thru the atmosphere, capable of taking off and landing with its longitudinal axis at a steep angle of inclination to a horizontal plane, comprising: a load-holding body; aerostatic means, connected to the said body, comprising skin means and lighter-than-air gas within the skin means having a center of aerostatic lift that is forward of a plane that is normal to said longitudinal axis and contains the center of gravity of the vehicle and is above a plane that is normal to said first-named plane and contains said center of gravity, a straight line between the said center of lift and center of gravity making an angle with said longitudinal axis of at least twenty-five degrees and less than eighty degrees, the said aerostatic means exerting a torque about the center of gravity tending, when the vehicle is up in the air, to raise its forward part above its stern and to incline its longitudinal axis at an angle of at least twenty-five degrees and less than eighty degrees to a horizontal plane, with the center of aerostatic lift substantially directly above the center of gravity;

winged means having a center of aerodynamic lift when the vehicle is underway that is in a plane which is transverse to said longitudinal axis and in the vicinity of the vehicle's center of gravity; stern-elevating, vehicle-attitude-controlling, propulsive means of controllable thrust, having an upright axis and providing a controllable, stern-lifting torque about the center of gravity that is in opposition to the torque of the said aerostatic means and at its maximum at least balances the torque of the aerostatic means;

other vehicle-attitude-controlling means, mounted on said body, for raising the vehicle's forward end above its stern and lowering its forward end below its stern; and means for forwardly moving said vehicle thru the air; said body having a top and a bottom that are imperforate from the body's forward end to the vicinity of said center of gravity.

17. A vehicle as set forth in claim 16, in which said winged means comprises an elongated flat surface on the bottom of the vehicle, having an angle of attack in said taking off and landing.

18. A vehicle as set forth in claim 16, over thirty feet in length, in which: said tubular members are elongated and comprise flexible, ductile wall material; and said gaseous material comprises gas under pressure well above that of the atmosphere.

19. A vehicle as set forth in claim 16, in which: said load-holding body has forward, middle and rear parts; portions of said forward and rear parts project outward beyond exterior outlines of said middle part in spaced substantially planar, balloon-holding walls; and said aerostatic means comprises disk-ended balloon units, having end disks juxtaposed to surfaces of said balloon-holding walls; and glue between said juxtaposed surfaces and end disks.

20. A vehicle as set forth in claim 16, in which said stern-elevating means comprises a wind-channel tube extending from a top portion to a bottom portion of the craft and a rotary propeller in said tube; the said vehicle comprising a second rotary propeller, of controllable thrust, counteracting the vehicle-yawing torque of said first-named propeller, and serving as a means for steering the craft.

21. A vehicle as set forth in claim 16 that is heavier than air.

22. A vehicle as set forth in claim 16, in which: said means for moving the vehicle thru the air comprises fuel-consuming motors; the said vehicle supports a substantial quantity of fuel at takeoff; the vehicle is heavier than air in taking off and lighter-than-air after said motors have consume a substantial amount of said fuel; said stern-elevating means comprises a pivoted elevator, adjustable to have a positive or negative angle of attack; and the vehicle comprises a pivoted, elevating plane, pivotally mounted at a forward part of said body, and controllable to have a positive or a negative angle of attack.

23. A vehicle as set forth in claim 16, in which: its rear part comprises a bottom having a streamlined forward bottom surface, exposed in flight to ambient air, that is more nearly horizontal than the rear-end portion of the bottom, and having a rear bottom surface, exposed in flight to ambient air, sloping upward from its forward end, which is adjacent to the said forward surface, to the rearmost end of the craft; and said vehicle comprises landing-gear means at said rear surface, for facilitating taking off and landing with respect to a takeoff-and-landing medium, the lowermost edges of said landing-gear means, after landing of the vehicle, being in contact with said medium.

24. A vehicle as set forth in claim 16, comprising: an annular wind channel, connected to said body; powered steering means mounted within said wind channel; auxiliary steering means, usable in event of failure of said powered steering means, comprising a rudder, normally in fore-and-aft, substantial alignment with said wind channel; and fairing means, streamlinedly positioned between said rudder and wind channel.

25. A vehicle as set forth in claim 16, in which: the said body comprises forward and rear parts and an elongated middle part, the said forward and rear parts having fore-and-aft-spaced wall portions that jut outward from and are joined to said middle part; a plurality of lighter-than-air units, supported by and between said spaced wall portions; numerous elongated, stiffly resilient tubular members, providing a vehicle-strengthening framework, sheathing said lighter-than-air units, each of said tubular members comprising thin, flexible, dense material, pressurized gas within said material, and sealed flat ends that are fixed to outer edges of said wall portions; and skin means enveloping said tubular members and said lighter-than-air units, streamlinedly connected to said wall portions and flat ends.

26. A vehicle as set forth in claim 16, in which the said winged means comprises a pair of wings, one of which extends from each side of said body.

27. A vehicle as set forth in claim 26, in which said wings have a center line of aerodynamic lift that is rearward of said center of gravity.

28. A vehicle as set forth in claim 26, in which: said winged means comprises tubular spars, extending into and connected within said body; and the vehicle comprises motor means in said body, connected to said spars, for pivoting said wings into variable angles of attack.

29. A vehicle as set forth in claim 26, in which said wings comprise a plurality of tubular members, each of which contains gaseous material under a pressure well above that of the atmosphere at sea level.

30. A vehicle as set forth in claim 29, in which said gas is lighter than air and each of said tubular members comprises a tubular element having substantially flat ends.

31. A vehicle as set forth in claim 16, in which said other vehicle-attitude-controlling means coprises auxiliary airfoil means and mechanism for pivoting said auxiliary means, controllable by the pilot of the vehicle, for counterbalancing at least a portion of the said torque of the aerostatic means.

32. A vehicle as set forth in claim 31, in which: the maximum torque of said stern-elevating propulsive means overbalances the torque of said aerostatic means, depressing the forward end of the vehicle and tending to force said lingitudinal axis into a negative angle with a horizontal plane; and the said auxiliary airfoil means comprises a forward elevator, pivotally mounted on a forward-end portion of the vehicle, controllable by the pilot to counterbalance the said overbalancing torque of the stern-elevating propulsive means.

33. A vehicle as set forth in claim 31, in which said other vehicle-attitude-controlling means comprises a rear elevator, pivotally mounted on a rear-end portion of the vehicle.

34. A vehicle as set forth in claim 31, in which the said other vehicle-attitude-controlling means comprises wing flaps, pivotally mounted on said winged means, at least most of its aerodynamic surfaces being located rearward of said center of gravity.

35. A vehicle as set forth in claim 31, in which the said other vehicle-attitude-controlling means comprises an airfoil that is pivotally mounted on a forward-end portion of the vehicle and an airfoil that is pivotally mounted on a rear-end portion of the vehicle.

36. A vehicle as set forth in claim 16, in which said body has walls that comprise resilient tubular members and gaseous material in said members.

37. A vehicle as set forth in claim 36 in which: at least some of said tubular members comprise individual elongated tubes; each of said tubes has at its ends a pair of said substantially flat end portions; and each of said last-named flat end portions comprises closely juxtaposed, substantially planar portions and bonding material between said planar portions.

38. A vehicle as set forth in claim 37, in which: each of said individual tubes has sufficient length in proportion to the cross-sectional area of its middle portion to be circular in cross section at that middle portion; and each of said last-named middle portions is cylindrical.

39. A vehicle as set forth in claim 36, in which said tubular members comprise: flexible, substantially non-extensible material rounded middle portions; substantially flat end the said last-named flat end portion projecting upward into ambient air and serving as a fin-like stabilizer.

40. A vehicle as set forth in claim 39, in which said gaseous material comprises lighter-than-air gas.

41. A vehicle as set forth in claim 39, in which at least some of said tubular members comprise end-joined inflated links in each tubular member, each of said inflated links having: a rounded middle portion; a pair of wider, flatter and thinner link-end portions; tapering, curved surfaces slanting inward from said middle portion to each of said wider link-end portions; and tapering, curved surfaces slanting outward from said middle portion to the thinner part of each of said flatter end portions. d 42. A vehicle as set forth in claim 41, in which the said link-end portion between each two adjacent links comprises bonding material, sealing across the link-end portion, and barring flow of gaseous material between said adjacent links.

43. A vehicle as set forth in claim 41, in which: said body comprises at least one pair of orthogonally-arranged walls; and each of said orthogonally arranged walls comprises space-filling chocks adjacent to at least some of said link-end portions; and each of said chocks has a middle part at a said wider dimension that is thicker than each of its ends, and has curvingly tapered surfaces shaped to conform to portions of said tubular-member curved, tapering surfaces, filling space between adjacent tubular members and strengthening them at their junction.

* * * * *

UNITED STATES PATENT OFFICE
CERTIFICATE OF CORRECTION

Patent No. 3,801,044     Dated  April 2, 1974

Inventor(s)    Alvin Edward Moore

It is certified that error appears in the above-identified patent and that said Letters Patent are hereby corrected as shown below:

In Figure 1, lengthen the lead lines of numerals 91 and 96'. Correct Figure 26 by erasing numerals 170 and 196 and their lead lines (one being an arrow), and changing numerals 166, 167, 168, 169 and 198 to, respectively, 264, 128, 268, 269 and 262, and adding numerals 121, 122, 266 and 267. Column 6, line 47, "falt-ended" should read -- flat-ended --. line 55, after "welding" insert a comma. Column 8, line 47, "an" should read -- and --; line 47, "on" should read -- or --. Column 9, line 33, "he" should read -- the --; line 56, insert a comma after "optionally" and cancel "and". Column 10, line 7, "balloon" should read -- balloons --. Column 14, last line, "of" before "each", should be canceled. Column 23, line 38, "portions; each of said end portions compris-" should be canceled; the whole of lines 39 to 45 ("ing two closely adjacent ... said arrow spans") should be canceled; and after "direction;" in line 38, insert -- the said last-named flat end

UNITED STATES PATENT OFFICE
CERTIFICATE OF CORRECTION

Patent No. 3,801,044　　　　　　　　　　Dated　April 2, 1974

Inventor(s) Alvin Edward Moore

It is certified that error appears in the above-identified patent and that said Letters Patent are hereby corrected as shown below:

portion projecting upward into ambient air and serving as a fin-like stabilizer. --. Column 24, line 20, after "landing surface," insert -- the forward one of said pair of --. Column 27, line 22, "coprises" should read -- comprises --. Column 28, line 19, after "material" insert a semicolon; line 20, "the last-named flat end portion pro-" should be canceled, the whole of lines 5 and 6 of this claim ("jecting upward into ... stabilizer." should be canceled, and after "end" in line 4 of claim 39 the following matter should be insert -- portions, each of said end portions comprising two closely adjacent plies of tubular material joined together and having a relatively broad span in one direction and a relatively narrow span in another; curved, tapering surfaces slanting inward from said rounded middle portions to said broad spans; and curved, tapering surfaces slanting outward from said rounded middle portions to said narrow spans. --.

This certificate supersedes Certificate of Correction issued October 15, 1974.

Signed and sealed this 25th day of March 1975.

(SEAL)
Attest:

RUTH C. MASON
Attesting Officer

C. MARSHALL DANN
Commissioner of Patents
and Trademarks